United States Patent
Park

(10) Patent No.: US 11,405,143 B2
(45) Date of Patent: Aug. 2, 2022

(54) METHOD AND APPARATUS FOR TRANSMITTING SIDELINK HARQ FEEDBACK INFORMATION

(71) Applicant: KT CORPORATION, Gyeonggi-do (KR)

(72) Inventor: Kyujin Park, Seoul (KR)

(73) Assignee: KT CORPORATION, Gyeonggi-do (KR)

(*) Notice: Subject to any disclaimer, the term of this patent is extended or adjusted under 35 U.S.C. 154(b) by 2 days.

(21) Appl. No.: 16/574,403

(22) Filed: Sep. 18, 2019

(65) Prior Publication Data

US 2020/0099476 A1    Mar. 26, 2020

(30) Foreign Application Priority Data

Sep. 21, 2018  (KR) .......... 10-2018-0114042
Nov. 1, 2018   (KR) .......... 10-2018-0133120
Jul. 10, 2019  (KR) .......... 10-2019-0082956

(51) Int. Cl.
   *H04L 1/18*      (2006.01)
   *H04W 72/04*     (2009.01)
   *H04W 4/40*      (2018.01)

(52) U.S. Cl.
   CPC ....... *H04L 1/1812* (2013.01); *H04W 72/0406* (2013.01); *H04W 4/40* (2018.02)

(58) Field of Classification Search
   CPC .......... H04L 1/1812; H04W 4/06; H04W 4/40
   See application file for complete search history.

(56) References Cited

U.S. PATENT DOCUMENTS

| | | | |
|---|---|---|---|
| 2017/0231023 A1* | 8/2017 | Adachi | H04L 69/40 |
| 2017/0264395 A1* | 9/2017 | Wakabayashi | H04W 76/14 |
| 2018/0288794 A1* | 10/2018 | Wang | H04W 72/1289 |
| 2019/0052436 A1* | 2/2019 | Desai | H04L 5/0055 |
| 2020/0067655 A1* | 2/2020 | Zheng | H04L 1/1896 |
| 2020/0221444 A1* | 7/2020 | Tiirola | H04L 1/1812 |

* cited by examiner

*Primary Examiner* — Mansour Oveissi
(74) *Attorney, Agent, or Firm* — Invenstone Patent, LLC

(57) ABSTRACT

Provided is a method of a receiver UE for transmitting sidelink HARQ feedback information. The method includes receiving a sidelink data channel (a physical sidelink shared channel, "PSSCH") over unicast or groupcast, determining a HARQ feedback mode for transmitting HARQ feedback information in response to the reception of the PSSCH, and transmitting the HARQ feedback information according to a result obtained by decoding the PSSCH based on the determined HARQ feedback mode.

3 Claims, 20 Drawing Sheets

FIG.16

SCI format

| ... | HARQ feedback mode indicator | ... | scheduling information | ... |

*FIG.17*

DCI format

| ... | HARQ feedback mode indicator | ... | scheduling information | ... |

METHOD AND APPARATUS FOR TRANSMITTING SIDELINK HARQ FEEDBACK INFORMATION

CROSS-REFERENCE TO RELATED APPLICATION

This application claims the priority benefit of Korean Patent Application No. 10-2018-0114042, filed on Sep. 21, 2018, No. 10-2018-0133120, filed on Nov. 1, 2018 and No. 10-2019-0082956, filed on Jul. 10, 2019 in the Korean Intellectual Property Office, the disclosures of which are incorporated herein by reference in their entirety.

BACKGROUND

1. Technical Field

The present disclosure relates to methods and apparatuses for transmitting sidelink HARQ feedback information in a next-generation/5G radio access network (hereinafter, referred to as a new radio, "NR").

2. Description of the Related Art

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra-reliable and low latency communication (URLLC) are proposed as representative usage scenarios of the NR. In order to meet the requirements of the individual scenarios, it is required to design the NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from other (E.g., subcarrier spacing, subframe, Transmission Time Interval (TTI), etc.) as a method for efficiently satisfying each usage scenario requirement through a frequency band constituting any NR system.

To address such issues, it is required to develop a design for transmitting HARQ ACK/NACK feedback information on a physical communication link that is a radio link between user equipments for providing a V2X service in the NR. Such a physical communication link is referred to as a sidelink in the NR.

SUMMARY

It is at least one object of the present disclosure to provide specific methods and apparatuses for enabling HARQ feedback information to be transmitted according to a HARQ feedback mode in the NR sidelink.

In accordance with one aspect of the present disclosure, a method of a receiver UE (user equipment, hereinafter, may be referred to as "UE") is provided for transmitting sidelink HARQ feedback information, the method comprising: receiving a sidelink data channel (a physical sidelink shared channel, "PSSCH") over unicast or groupcast, determining a HARQ feedback mode for transmitting HARQ feedback information in response to the reception of the PSSCH, and transmitting the HARQ feedback information according to a result obtained by decoding the PSSCH based on the determined HARQ feedback mode.

In accordance with another aspect of the present disclosure, a method of a transmitter UE is provided for receiving sidelink HARQ feedback information, the method comprising: transmitting a sidelink data channel (a physical sidelink shared channel, "PSSCH") over unicast or groupcast, and receiving HARQ feedback information according to a result obtained by decoding the PSSCH based on a HARQ feedback mode determined by a receiver UE.

In accordance with further another aspect of the present disclosure, a receiver UE is provided for transmitting sidelink HARQ feedback information, the receiver UE comprising: a receiver configured to receive a sidelink data channel (a physical sidelink shared channel, "PSSCH") over unicast or groupcast, a controller configured to determine a HARQ feedback mode for transmitting HARQ feedback information in response to the reception of the PSSCH, and a transmitter configured to transmit the HARQ feedback information according to a result obtained by decoding the PSSCH based on the determined HARQ feedback mode.

In accordance with yet another aspect of the present disclosure, a transmitter UE is provided for receiving sidelink HARQ feedback information, the transmitter UE comprising: a transmitter transmitting a sidelink data channel (a physical sidelink shared channel, "PSSCH") over unicast or groupcast, and a receiver receiving HARQ feedback information according to a result obtained by decoding the PSSCH based on a HARQ feedback mode determined by a receiver UE.

In accordance with embodiments of the present disclosure, it is possible to provide methods and apparatuses for determining a HARQ feedback mode for transmitting NR sidelink HARQ feedback information and transmitting the sidelink HARQ feedback information according to the determined HARQ feedback mode.

BRIEF DESCRIPTION OF THE DRAWINGS

The above and other aspects, features, and advantages of the present disclosure will be more apparent from the following detailed description taken in conjunction with the accompanying drawings, in which:

FIGS. 16 and 17 are views for explaining explicitly indicating a HARQ feedback mode in accordance with embodiments of the present disclosure;

DETAILED DESCRIPTION

Figure 1:
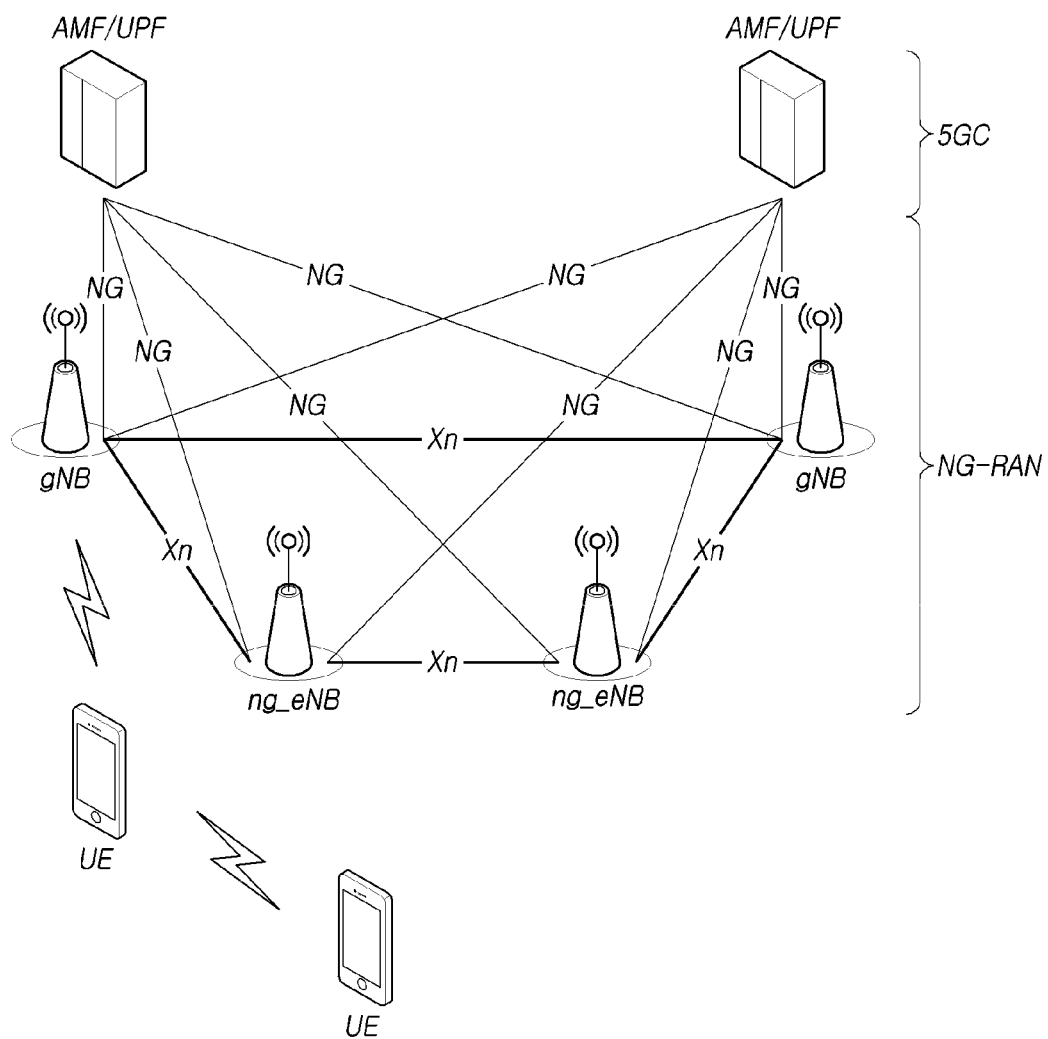
FIG. 1 is a view schematically illustrating an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information through a control channel, such as a physical downlink control channel (PDCCH) and a physical uplink control channel (PUCCH). The uplink and downlink transmit and receive data through a data channel such as a physical downlink shared channel (PDSCH) and a physical uplink shared channel (PUSCH). Hereinafter, the transmission and reception of a signal through a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR discloses a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system to which the present embodiment is applicable.

Referring to FIG. 1, the NR system is divided into a 5G core network (5GC) and an NG-RAN part, and the NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1: FR1) and frequency bands equal to or greater than 6 GHz (frequency range 2: FR2).

The gNB denotes a base station that provides a UE with an NR user plane and control plane protocol end, and the ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario through frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP), and, as shown in Table 1 below, "$\mu$" is used as an exponential value of 2 so as to be changed exponentially on the basis of 15 kHz.

TABLE 1

| $\mu$ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
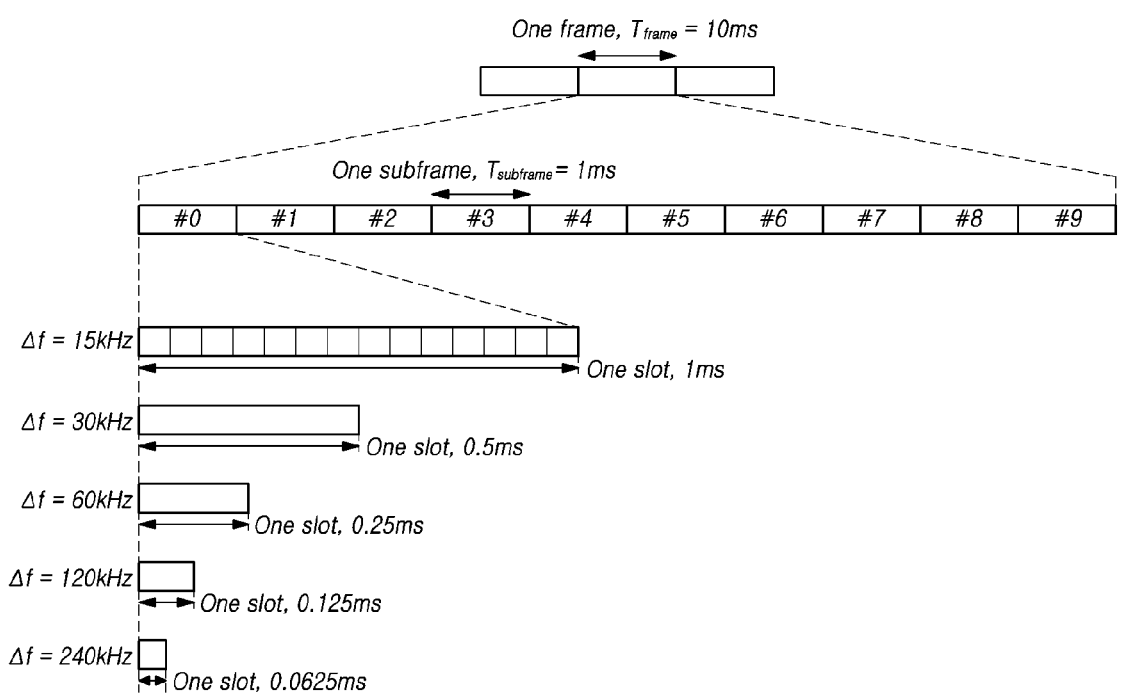
FIG. 2 is a view schematically illustrating the structure of an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system to which the present embodiment may be applied.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
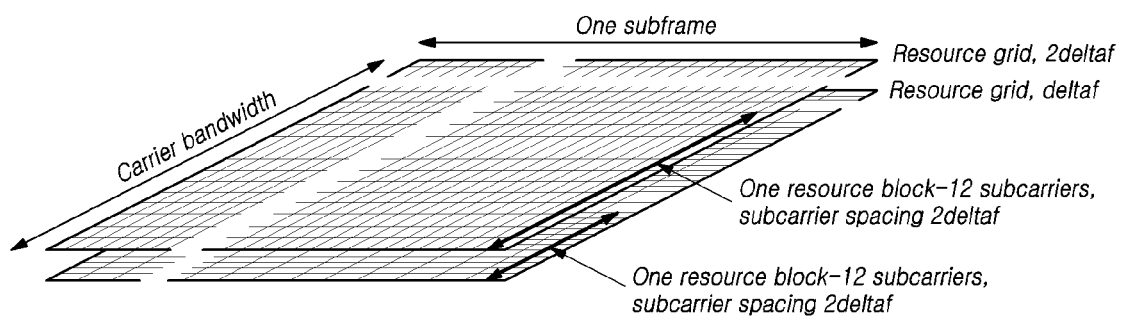
FIG. 3 is a view for explaining resource grids supported by a radio access technology in accordance with embodiments of the present disclosure.

FIG. 3 is a view for explaining resource grids supported by a radio access technology to which the present embodiment is applicable.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
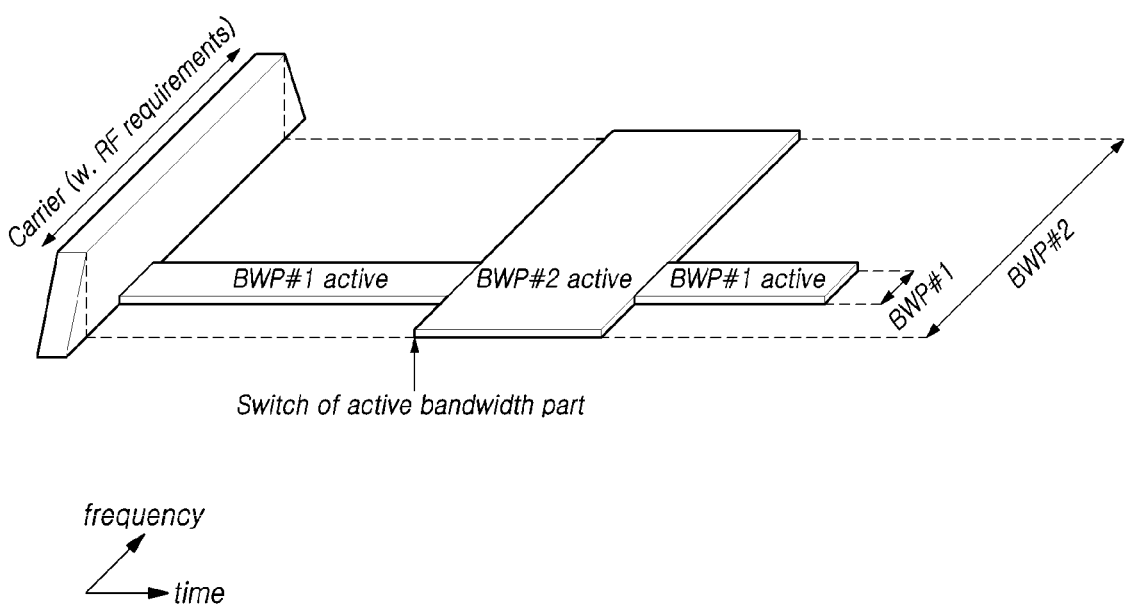
FIG. 4 is a view for explaining bandwidth parts supported by a radio access technology in accordance with embodiments of the present disclosure.

FIG. 4 is a view for explaining bandwidth parts supported by a radio access technology to which the present embodiment is applicable.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink, and the UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs so as to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
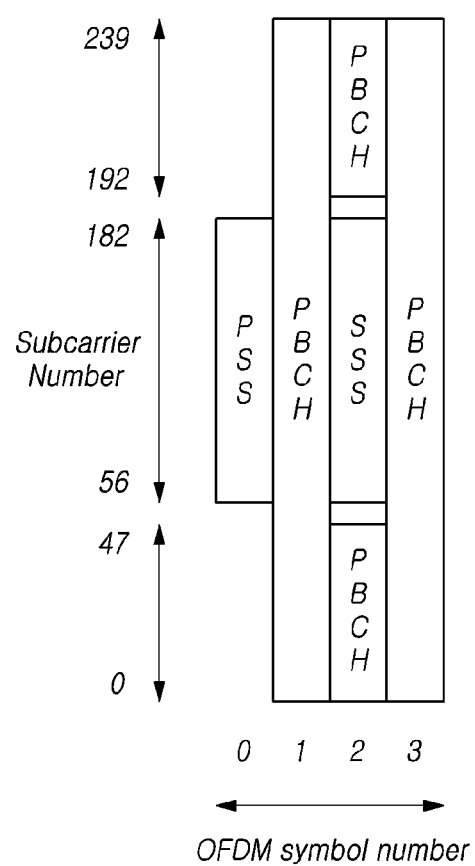
FIG. 5 is a view illustrating an example of a synchronization signal block in a radio access technology in accordance with embodiments of the present disclosure.

FIG. 5 is a view illustrating an example of a synchronization signal block in a radio access technology to which the present embodiment is applicable.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that can be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB through the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted through a PDSCH. In order to receive SIB1, the UE must receive numerology information used for the SIB1 transmission and the CORESET (control resource set) information used for scheduling of SIB1 through a PBCH. The UE identifies scheduling information for SIB1 using SI-RNTI in the CORESET, and acquires SIB1 on the PDSCH according to scheduling information. The remaining SIBs other than SIB1 may be periodically transmitted, or the remaining SIBs may be transmitted according to the request of the UE.

Figure 6:
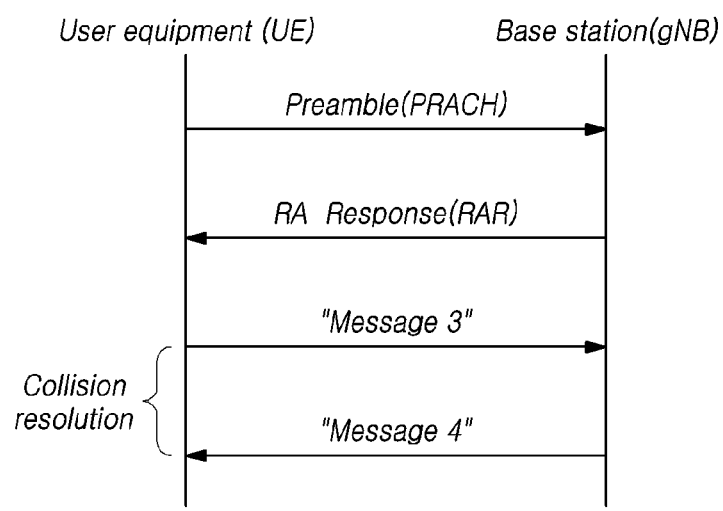
FIG. 6 is a view for explaining a random access procedure in a radio access technology in accordance with embodiments of the present disclosure.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted through a PRACH. Specifically, the random access preamble is periodically transmitted to the base station through the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/ downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
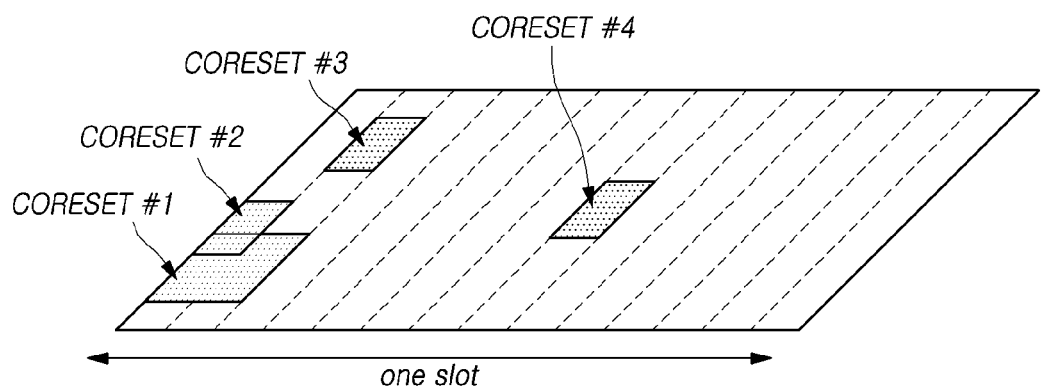
FIG. 7 is a view for explaining CORESET.

FIG. 7 is a view for explaining CORESETs.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

<LTE Sidelink>

In the LTE system, for providing a device-to-device communication service and a vehicle-to-everything (V2X) (in particular, vehicle-to-vehicle (V2V)) service, there are designs developed for a radio channel and a radio protocol for direct communication (i.e. sidelink) between devices.

With respect to the sidelink, a synchronization signal (PSSS/SSSS) is defined for synchronizing between a radio sidelink transmission end and a radio sidelink reception end, and a physical sidelink broadcasting channel (PSBCH) is defined for transmitting/receiving a sidelink master information block (MIB) related to this. Further, there are many studies conducted to develop designs on a physical sidelink discovery channel (PSDCH) for transmitting/receiving discovery information, a physical sidelink control channel (PSCCH) for transmitting/receiving sidelink control information (SCI), and a physical sidelink shared channel (PSSCH) for transmitting/receiving sidelink data.

In order to allocate a radio resource for the sidelink, two modes have been developed, i.e. mode 1 in which a base station allocates a radio resource and mode 2 in which a UE selects and allocates a radio resource from a radio resource pool. Further, in order to satisfy the V2X scenario in the LTE system, a related technology has been required to be developed additionally.

In such an environment, the 3GPP have derived 27 service scenarios related to vehicle recognition/detection in Rel-14 and determined key performance requirements according to road conditions. In addition, the 3GPP have derived 25 service scenarios, such as vehicle platooning, advanced driving, remote driving, an extended sensor, or the like, evolved from Rel-14, and determined 6 performance requirements in Rel-15.

In order to satisfy such performance requirements, there are many studies conducted for improving the performance of the sidelink technology developed based on the typical D2D communication to meet requirements of the V2X. In particular, in order to apply to the C-V2X (Cellular-V2X), a technology for improving a design of the physical layer of the sidelink to be adapted to a high-speed environment, a resource allocation technology, a synchronization technology may be selected as further study items.

The sidelink means a link used in D2D communication after Rel-12 of the 3GPP and V2X communication after Rel-14, and the terms for each channel, synchronization signal, and resource are described using equal terms without differently being defined according to requirements of the D2D communication, requirements of the V2X communication in Rel-14 and Rel-15. This is for convenience of description and ease of understanding, and when needed, discussions will be conducted by focusing on a difference of the sidelink satisfying V2X scenario requirements relative to the sidelink for the D2D communication in Rel-12/13. Accordingly, the terms related to the sidelink discussed below are classified into D2D communication, V2X communication, and C-V2X communication for merely comparison between them and ease of understanding; therefore, such terms are not limited to a specific scenario.

<Resource Allocation>

Figure 8:
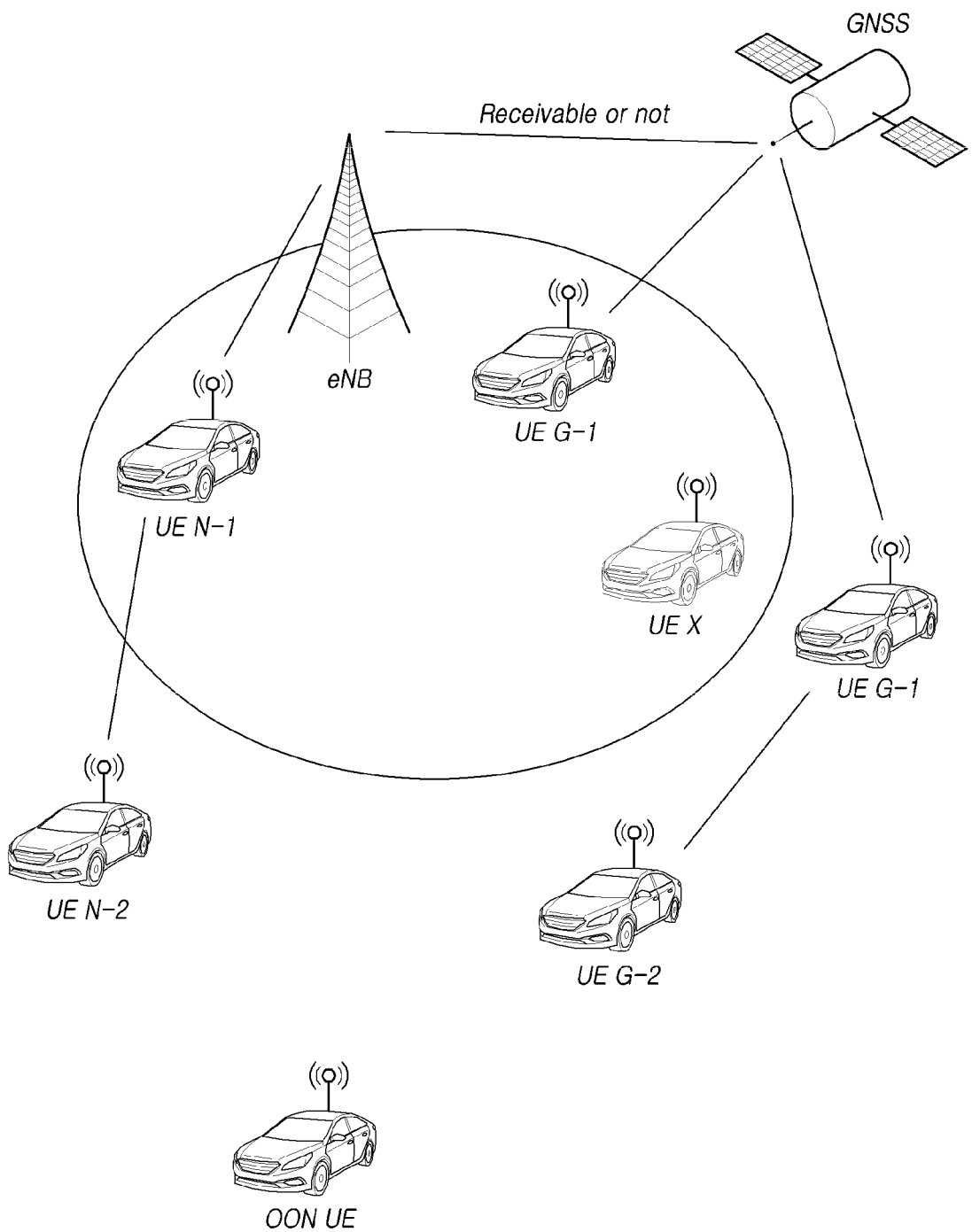
FIG. 8 is a view for explaining various scenarios for V2X communication.

FIG. 8 is a view for explaining various scenarios for V2X communication.

Referring to FIG. 8, a V2X device (represented to a vehicle; however, may be replaced with other devices, such as a user equipment (UE), etc.) may be located in coverage of a base station (an eNB, a gNB, or an ng-eNB), or located outside of coverage of the base station. For example, communication may be performed between UEs (e.g., UE N-1, UE G-1, UE X) in coverage of the base station, or communication may be performed between a UE in coverage of the base station and a UE (e.g., UE N-1, UE N-2) outside of coverage of the base station. Alternatively, communication may be performed between UEs (e.g., UE G-1, UE G-2) out of coverage of the base station.

In such various scenarios, it is necessary to allocate a radio resource for enabling a corresponding UE to perform communication using the sidelink. The allocation of the radio resource includes a method of a base station for handling the allocation of the radio resource and a method of a UE for selecting and allocating the radio resource.

Specifically, in the D2D, for enabling a UE to allocate a resource, two modes are defined. for example, a centralized mode (mode 1) and a distributed mode (mode 2). In the centralized mode (mode 1), a base station intervenes in the selection and management of the resource. The distributed mode (mode 2), a UE selects randomly one or more of pre-configured resources. Similar to the D2D, other modes are defined, such as, a third mode (mode 3) and a fourth mode. In the third mode (mode 3), a base station intervenes in the selection and management of the resource in the C-V2X. In the fourth mode (mode 4), a vehicle directly selects a resource in the V2X. Furthermore, in the third mode (mode 3), a base station provides a schedule of a scheduling assignment (SA) pool resource area and a data pool resource area allocated to this to a transmitter UE.

Figure 9A:
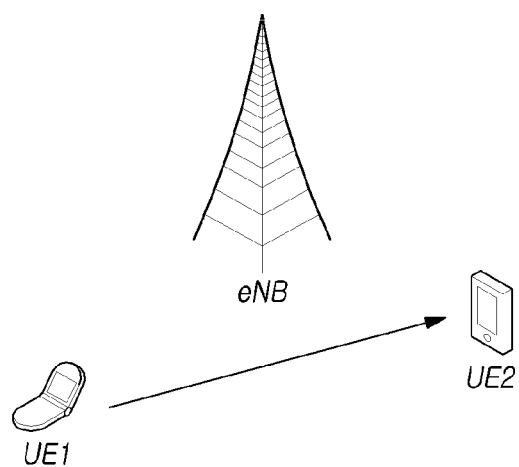
FIG. 9A is a view illustrating a first UE (UE1) and a second UE (UE2) performing sidelink communication.
Figure 9B:
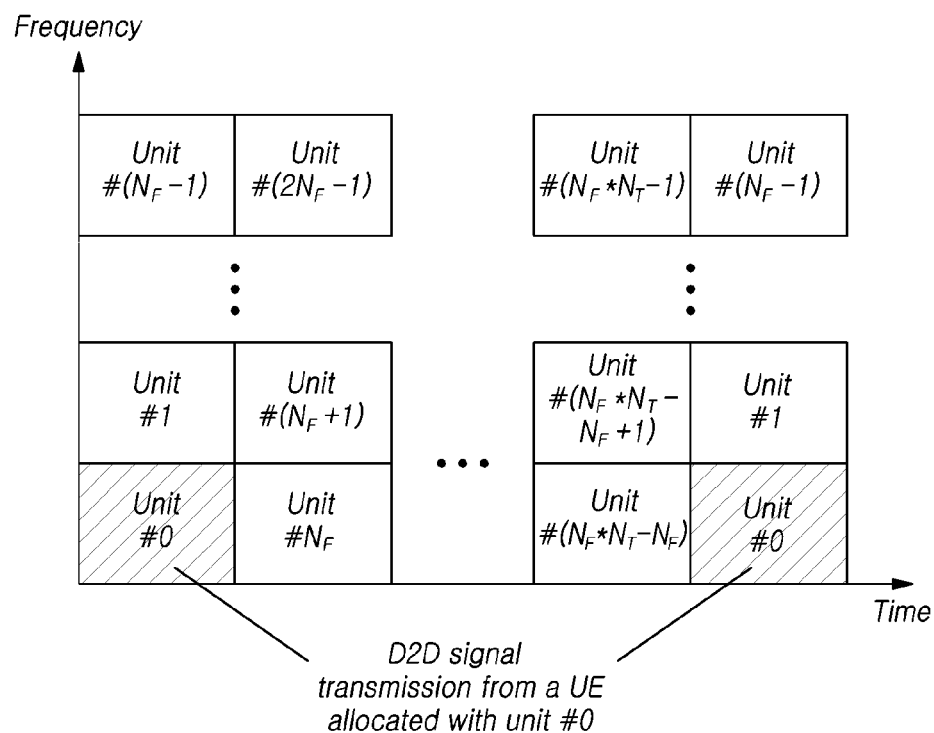
FIG. 9B is a view illustrating an example of resource pools for UEs.

FIG. 9A illustrates a first UE (UE 1) and a second UE (UE 2) performing sidelink communication, and FIG. 9B illustrates an example of resource pools used by the UEs.

Referring to FIG. 9A and FIG. 9B, a base station is represented as an eNB; however, may be a gNB or an ng-eNB as described above. Further, the UEs are represented as mobile terminals; however, vehicles, infrastructures, or the like may be applied variously depending on scenarios or situations.

In FIG. 9A, the transmitter UE (UE 1) may select a resource unit corresponding to a specific resource within a resource pool including a set of resources and transmit a sidelink signal using the resource unit. The receiver UE (UE 2) may be configured with a resource pool over which the UE 1 is allowed to transmit a signal, and the receiver UE (UE 2) may detect a transmission signal from the UE 1.

If the UE 1 is in coverage of the base station (For example, available to receive services or signals from the base station), the base station may provide the resource pool to the UE 1. If the UE 1 is out of coverage of the base station (For example, unavailable to receive services or signals from the base station), the resource pool may be determined as one or more resources which are pre-configured or provided by another UE. Normally, the resource pool is made up of a plurality of resource units, and each UE may select one or more resource units and use the selected resource unit(s) for transmitting a sidelink signal.

Referring to FIG. 9B, the entire frequency resource is divided into NF frequency resources, and the entire time resource is divided into NT time resources. Thus, a total of NF*NT resource units may be defined. In this case, it is possible to express that a corresponding resource pool is repeated at a period of NT subframes. In particular, one resource unit may be configured to be provided periodically and repeatedly, as illustrated in FIG. 9B.

The resource pool may be classified into several types according to a certain criterion. For example, the resource pool may be classified into several types according to contents of a sidelink signal transmitted over each resource pool. As one example, the contents of the sidelink signal may be classified, and a separate resource pool may be configured for each of the contents. Scheduling assignment (SA), a sidelink channel, a discovery channel, or the like may be examples of the contents of the sidelink signal.

The SA may be a signal including information, such as, a location of a resource used to transmit a subsequent sidelink data channel by a transmitter UE, a modulation and coding scheme (MCS) that is needed to demodulate a data channel, a MIMO transmission scheme, timing advance (TA), or the like. This signal may be transmitted by being multiplexed with sidelink data over an identical resource unit as well. In this case, the SA resource pool may mean a pool of resources over which the SA is transmitted by being multiplexed with the sidelink data.

An FDM scheme applied to the V2X communication may lead a time delay until a data resource is allocated after a SA resource has been allocated to be reduced. For example, it is possible to consider a non-adjacent scheme in which a control channel resource and a data channel resource are split in time domain in one subframe, an adjacent scheme in which a control channel and a data channel are consecutively allocated in one subframe, or the like.

When the sidelink data along with the SA are multiplexed and transmitted over an identical resource unit, a sidelink data channel only in a different form from SA information may be transmitted over a resource pool for the sidelink data channel. In other words, resource elements used to transmit SA information over one or more individual resource units within a SA resource pool may be used still for transmitting sidelink data in a sidelink data channel resource pool. The discovery channel may be a resource pool for a message for enabling a transmitter UE to transmit information, such as an ID of the transmitter UE, or the like, and a neighboring UE to discover the transmitter UE. Even when contents of the sidelink signal are equal, different resource pools may be used according to transmission and/or reception characteristics of the sidelink signal.

For example, in even the case of an identical sidelink data channel or a discovery message, a different resource pool may be used according to a method of determining a transmission timing of a sidelink signal (e.g., whether the sidelink signal is transmitted at the time of receiving a synchronization reference signal or transmitted by applying a certain TA from the time of receiving the synchronization reference signal) or a method of allocating a resource (e.g., whether a base station dedicates a resource for transmitting a signal to a transmitter UE or whether a transmitter UE on its own selects a resource for transmitting a signal in a pool), a signal format (e.g., the number of symbols occupied by each sidelink signal in one subframe, the number of subframes used for transmitting one sidelink signal), a signal strength of from a base station, a transmission power strength of a sidelink UE, or the like.

<Synchronization Signal>

As described above, a V2X communicating UE may be located out of coverage of a base station. In even this situation, it is necessary to perform communication using the sidelink. To do this, it is important for a UE located out of coverage of the base station to achieve synchronization.

Hereinafter, a method of performing time and frequency synchronization in sidelink communication, particularly in communication between vehicles, between a vehicle and a UE, or between a vehicle and a communication network will be described based on the description above.

The D2D communication utilizes a sidelink synchronization signal (SLSS), which is a synchronization signal transmitted from a base station for time synchronization between UEs. In the C-V2X, a satellite system (the Global Navigation Satellite System (GNSS)) may be additionally considered for enhancing synchronization performance. In this case, priority may be given to synchronization establishment or a base station may indicate information on priority. For example, when determining its transmission synchronization, a UE selects a synchronization signal directly transmitted from a base station as a highest priority, and, when the UE is out of coverage of the base station, synchronizes with the SLSS transmitted from another UE in coverage of the base station as a higher priority.

Since a wireless terminal (hereinafter, for convenience of description, may be referred to as the UE as well) installed in a vehicle, or a UE mounted in the vehicle has a less problem with battery consumption and may use a satellite signal such as the GPS for navigation purposes, the satellite signal may be used for configuring time or frequency synchronization between UEs. The satellite signal may include, as well as the Global Positioning System (GPS), the GLObal NAvigation Satellite System (GLONAS), GALILEO, BEIDOU, or the like.

The sidelink synchronization signal may include a primary sidelink synchronization signal (PSSS), a secondary sidelink synchronization signal (SSSS), or the like. The PSSS may include a Zadoff-chu sequence with a pre-configured length, a structure similar to the PSS, a structure changed from the PSS, or a structure in which the PSS is repeated. Unlike a DL PSS, a different Zadoff-chu root index (e.g. 26, 37) may be used. The SSSS may include an M-sequence, a structure similar to the SSS, a structure changed from the SSS, or a structure in which the SSS is repeated. When UEs synchronize with a base station, the SRN is served as the base station, and the SLSS is served as the PSS or the SSS.

Unlike the PSS/SSS of DL, the PSSS/SSSS uses an UL subcarrier mapping method. A physical sidelink synchronization channel (PSSCH) may be a channel for transmitting system information (e.g., information related to the SLSS, a duplex mode (DM), a TDD UL/DL configuration, information related to a resource pool, types of applications related to the SLSS, a subframe offset, broadcast information, or the like) which is basic information that the UE is required to identify first before transmitting/receiving a sidelink signal. The PSSCH may be transmitted over a subframe identical or subsequent to the SLSS. The DM-RS may be used for demodulation of the PSSCH.

The SRN may be a node for transmitting the SLSS or the PSSCH. The SLSS may be in the form of a specific sequence, and the PSSCH may be a sequence representing specific information or in the form of a codeword after pre-defined channel coding has been performed. Here, a base station or a specific sidelink UE may be served as the SRN. A UE may be served as the SRN in the case of partial network coverage or out-of-network-coverage.

When needed, the SLSS may be relayed, for example, through multi-hop, for sidelink communication with an out-of-coverage UE. Relaying a synchronization signal in description below includes, as well as directly relaying a synchronization signal of a base station, transmitting a sidelink synchronization signal in a separate format at the time of receiving the synchronization signal. Like this, since the sidelink synchronization signal is relayed, direct communication may be performed between an in-coverage UE and an out-of-coverage UE.

<NR Sidelink>

As described above, unlike the V2X based on the LTE system, it is required to develop NR-based V2X technology for satisfying complex requirements as in autonomous driving.

In accordance with embodiments of the present disclosure, it is possible to provide a flexible V2X service in more diverse environments by applying a frame structure, numerology, a channel transmission/reception procedure, or the like of the NR to the NR V2X. To this end, it is necessary to develop technologies, such as, a resource sharing technology between a base station and a UE, a sidelink carrier aggregation technology (CA), a partial sensing technology for a UE held by a pedestrian, a short transmission time interval (sTTI), or the like.

In the NR V2X, it has been determined to support unicast or groupcast, as well as broadcast used in the LTE V2X. In this case, it also has been determined to use a target group ID for the unicast or the groupcast, and but it has been determined to discuss later whether to use a source ID.

Further, as it has been determined to support HARQ for QOS, it has been determined that a HARQ process ID is included in control information. In the LTE HARQ, a PUCCH for the HARQ is transmitted after 4 subframes after DL has been transmitted. In the NR HARQ, for feedback timing, a PUCCH resource and a feedback timing may be indicated using a PUCCH resource indicator in DCI format 1_0 or 1_1 PUCCH or a HARQ feedback timing indicator in response to the PDSCH (PDSCH-to-HARQ feedback timing indicator).

Figure 10:
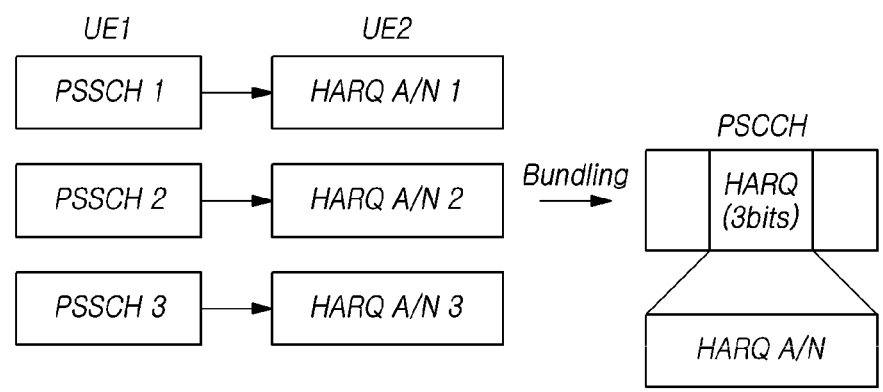
FIG. 10 is a view for explaining a method of bundling and transmitting HARQ feedback information in the V2X.

FIG. 10 is a view for explaining a method of bundling and transmitting HARQ feedback information in the V2X;

Referring to FIG. 10, in the LTE V2X, separate HARQ ACK/NACK information is not transmitted in order to reduce system overhead, and data are allowed to be retransmitted once according to discretion of a transmitter UE for data transmission safety. However, in the NR V2X, in terms of data transmission stability, HARQ ACK/NACK information may be transmitted, and in this case, overhead may be reduced by bundling and transmitting the corresponding information.

That is, when a transmitter UE UE1 transmits three data transmissions to a receiver UE UE2, and then the receiver UE generates HARQ ACK/NACK information in response to the transmissions, this may be bundled and transmitted through a PSCCH. FIG. 10 illustrates that HARQ ACK/NACK is transmitted through the PSCCH. However, the HARQ ACK/NACK may be transmitted through a separate channel or another channel, and the bundled HARQ information may be configured with 3 bits or less.

In FR1 for a frequency range of 3 GHz or less, 15 kHz, 30 kHz, 60 kHz, and 120 kHz have been discussed as a candidate subcarrier spacing (SCS). In FR2 for a frequency range exceeding 3 GHz, 30 kHz, 60 kHz, 120 kHz, and 240 kHz have been discussed as a candidate subcarrier spacing (SCS). In the NR V2X, a minislot (e.g., 2/4/7 symbols) smaller than 14 symbols can be supported as a unit of minimum scheduling.

The DM-RS, the PT-RS, the CSI-RS, the SRS, and the AGC training signal have been discussed as a candidate of the RS.

Figure 11A:
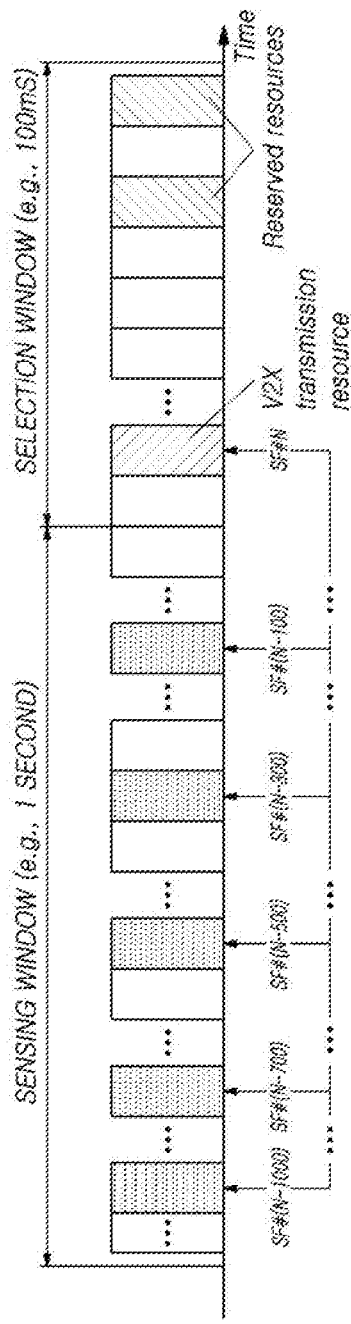
FIGS. 11A and 11B are illustrates an example of types of a V2X transmission resource pool.
Figure 11B:
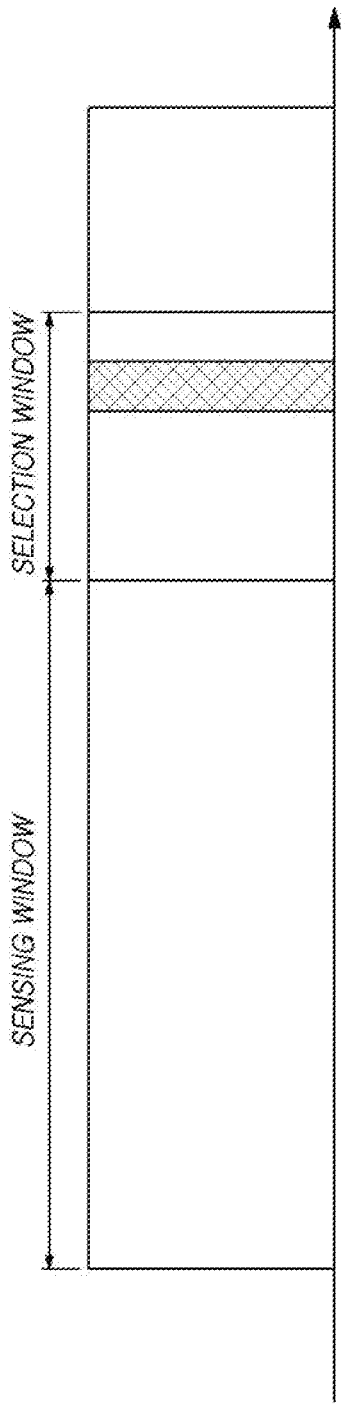

The following four options have been discussed for multiplexing of a PSCCH and an associated PSSCH, as illustrated in FIGS. 11A and 11B. Option 2 is similar to the multiplexing of the PSCCH and the PSSCH in the LTE V2X.

Synchronization Mechanism

NR V2X sidelink synchronization may include one or more sidelink synchronization signals and the PSBCH, and a sidelink source may include a UE in addition to the GNSS, and/or the gNB.

Resource Allocation

At least two sidelink resource allocation modes, i.e. mode 3 and mode 4, may be defined for NR V2X sidelink communication. In the third mode (mode 3), a base station schedules one or more sidelink resources used by a UE for sidelink transmission. In the fourth mode (mode 4), a UE determines one or more resources within one or more sidelink resources configured by a base station or one or more pre-configured sidelink resources.

Mode 4 may cover the following resource allocation sub-modes. That is, UE may automatically select a sidelink resource for transmission, help to select a sidelink resource for other UE(s), be configured with grant configured for sidelink transmission, or schedule the sidelink transmission of other UE(s).

V2X Resource Pool (Sensing and Selection Windows)

A V2X UE may transmit a message (or a channel) over a pre-defined (or signaled) resource pool. The resource pool may mean one or more resources pre-defined for enabling the UE to perform the V2X operation (or in the UE capable of performing the V2X operation). In this case, the resource pool may be defined in terms of time-frequency. The V2X transmission resource pool may be defined as various types.

FIGS. 11A and 11B are illustrates a type of a V2X transmission resource pool.

Referring to FIG. 11A, a V2X transmission resource pool # A may be a resource pool over which partial sensing only is allowed. A V2X transmission resource selected by the partial sensing is remained semi-statically at a regular interval.

Referring to FIG. 11B, the V2X transmission resource pool # B may be a resource pool over which a random selection only is allowed. In V2X transmit resource pool # B, a UE does not perform partial sensing and may randomly select a V2X transmission resource in a selection window.

As one example, unlike a resource pool over which partial sensing only is allowed, in a resource pool over which the random selection only is allowed, a selected resource may be configured/signaled not to be semi-statically reserved. In order for a UE to perform a V2X message transmission operation over a V2X transmission resource pool, a base station may cause the UE not to perform a sensing operation (based on scheduling allocation decoding/energy measurement).

Although not illustrated in FIGS. 11A and 11B, a resource pool over which both the partial sensing and the random selection are available may be used as well. A base station may notify a UE that a V2X resource may be selected by either of the partial sensing and the random selection.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

<NR(New Radio)>

Recently, the 3GPP has approved the "Study on New Radio Access Technology", which is a study item for research on next-generation/5G radio access technology. On the basis of the Study on New Radio Access Technology, discussions have been in progress for frame structures, channel coding and modulation, waveforms, multiple access methods, and the like for the new radio (NR). The NR is required to be designed not only to provide an improved data transmission rate as compared with the LTE/LTE-Advanced, but also to meet various requirements per detailed and specific usage scenario.

An enhanced mobile broadband (eMBB), massive machine-type communication (mMTC), and ultra-reliable and low latency communication (URLLC) are proposed as representative usage scenarios of the NR. In order to meet the requirements per usage scenario, it is required for designing the NR to have flexible frame structures, compared with the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios through a frequency band provided to an NR system.

To this end, there have been discussions on i) methods of multiplexing numerologies having subcarrier spacing (SCS) values different from one another based on TDM, FDM or TDM/FDM through one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms.

Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot made up of fewer OFDM symbols than the slot may be defined, and thus the scheduling for the latency critical data, such as the URLLC, may be performed based on the mini-slot.

Figure 12:
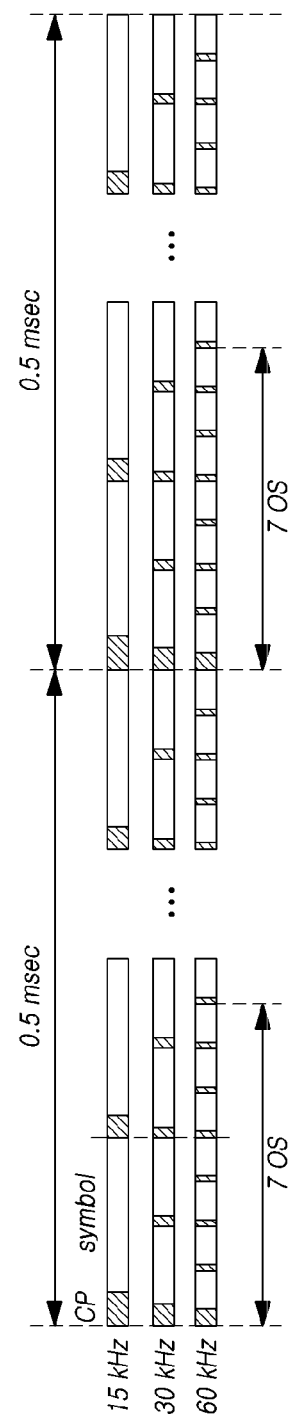
FIG. 12 is a view illustrating an example of symbol level alignment among different SCSs in accordance with embodiments of the present disclosure.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 12, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

<Wider Bandwidth Operations>

The typical LTE system supports scalable bandwidth operations for any LTC CC (component carrier). That is, according to a frequency deployment scenario, an LTE provider may configure a bandwidth of a minimum of 1.4 MHz to a maximum of 20 MHz in configuring a single LTE CC, and a normal LTE UE supports a transmission/reception capability of a bandwidth of 20 MHz for a single LTE CC.

Figure 13:
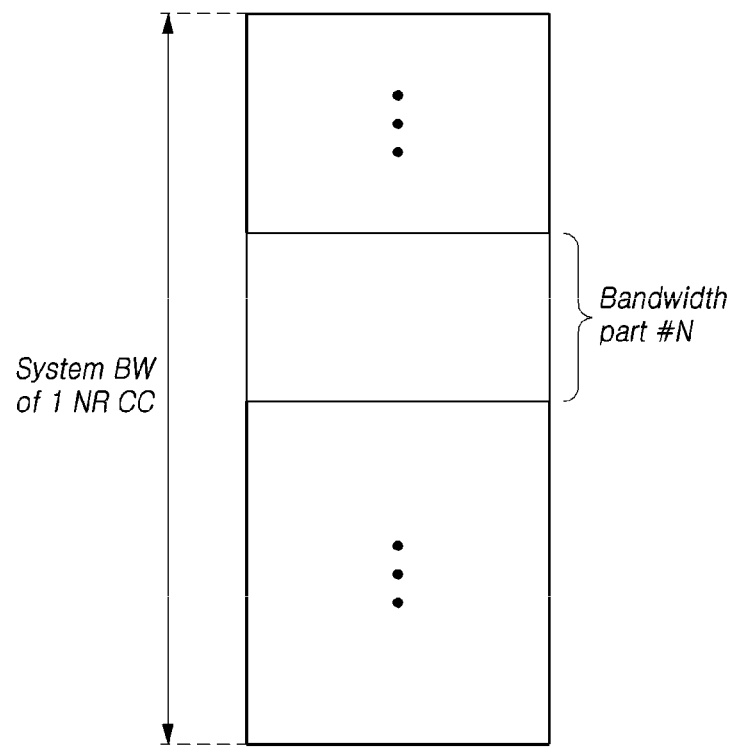
FIG. 13 is a view schematically illustrating a bandwidth part in accordance with embodiments of the present disclosure.

However, the NR is designed to be able to support the UE of NR having different transmission/reception bandwidth capabilities through a single wideband NR CC. Accordingly, it is required to configure one or more bandwidth parts (BWPs) including subdivided bandwidths for an NR CC as shown FIG. 13, thereby supporting a flexible and wider bandwidth operation through configuration and activation of different bandwidth parts for respective UEs.

Specifically, one or more bandwidth parts may be configured through a single serving cell configured in terms of a UE in NR, and the UE is defined to activate one downlink (DL) bandwidth part and one uplink (UL) bandwidth part so as to use the same for uplink/downlink data transmission/reception in the corresponding serving cell. In addition, in the case where a plurality of serving cells is configured in the UE (i.e., the UE to which CA is applied), the UE is also defined to activate one downlink bandwidth part and/or one uplink bandwidth part in each serving cell so as to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to make a definition such that a plurality of downlink and/or uplink bandwidth parts are simultaneously activated and used according to the capability of the UE and the configuration of the bandwidth parts in a serving cell. However, definition was made in NR rel-15 such that only one downlink (DL) bandwidth part and one uplink (UL) bandwidth part are activated and used in a UE at a time.

LTE Sidelink

In the LTE system, for providing a device-to-device direct communication service and a vehicle-to-everything (V2X) (in particular, vehicle-to-vehicle (V2V)) service, there are designs developed for a radio channel and a radio protocol for transmission/reception of the sidelink which is direct link between UEs have been developed. With respect to the sidelink, the PSSS/SSSS is defined as a signal for synchronizing between a radio sidelink transmission end and a radio sidelink reception end, and a physical sidelink broadcasting channel (PSBCH) is defined for transmitting/receiving a sidelink master information block (MIB) related to this. Further, there are many studies conducted for developing designs on a physical sidelink discovery channel (PSDCH) for transmitting/receiving discovery information, a physical sidelink control channel (PSCCH) for transmitting/receiving sidelink control information (SCI), and a physical sidelink shared channel (PSSCH) for transmitting/receiving sidelink data.

A Method of Allocating a HARQ ACK/NACK Feedback Resource

According to a PUCCH resource allocation method for HARQ ACK/NACK feedback of a UE defined in the NR, a base station configures a PUCCH resource set including one or more PUCCH resources for a UE and provides PUCCH resource information to be used for HARQ ACK/NACK feedback in response to a PDSCH transmission through an ACK resource indicator (ARI) information area of the DCI. In this case, the PUCCH resource set is configured per UL BWP configured for a corresponding UE, and separate PUCCH resource sets are configured according to a payload size of HARQ ACK/NACK for a UL BWP.

Hereinafter, a method of transmitting sidelink HARQ feedback information is specifically discussed with reference to drawings.

Figure 14:
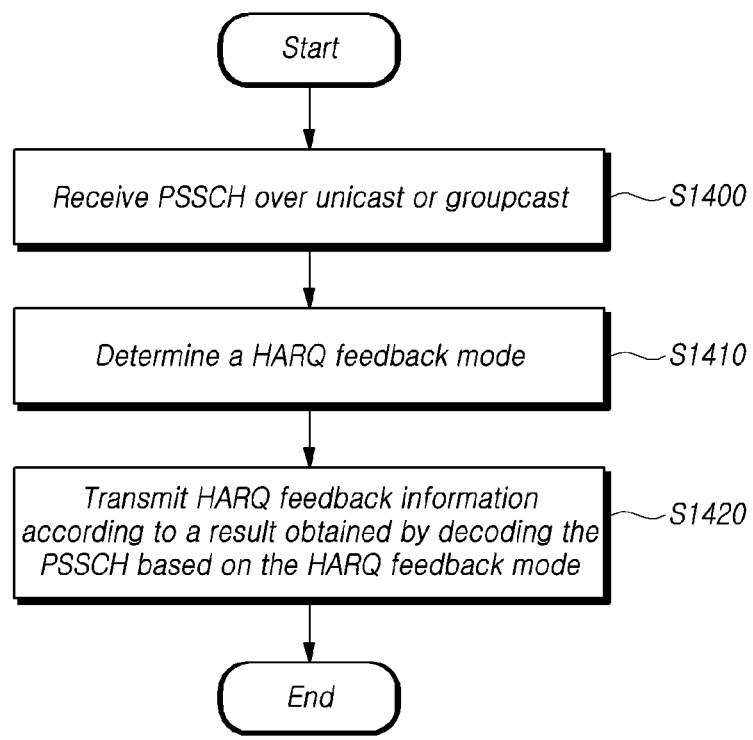
FIG. 14 is a flow diagram illustrating a procedure of transmitting sidelink HARQ feedback information by a receiver UE in accordance with embodiments of the present disclosure.

FIG. 14 is a flow diagram illustrating a procedure of transmitting sidelink HARQ feedback information by a receiver UE in accordance with embodiments of the present disclosure.

Referring to FIG. 14, a receiver UE may receive a physical sidelink shared channel (PSSCH) over unicast or groupcast at step S1400.

For example, sidelink transmission/reception based on the unicast or the groupcast, as well as the broadcast, may be supported in the NR-based V2X. Accordingly, the receiver UE may receive the PSSCH from a transmitter UE over the unicast scheme or the groupcast scheme.

Referring back to FIG. 14, the receiver UE may determine a HARQ feedback mode for transmitting HARQ feedback information in response to the reception of the PSSCH at step S1410.

The receiver UE may decode the PSSCH received from the transmitter UE. The receiver UE may determine the HARQ feedback mode for transmitting the HARQ ACK/NACK feedback information according to a result obtained by decoding the PSSCH.

In at least one embodiment, the HARQ feedback mode may be determined according to whether HARQ ACK information is transmitted when the PSSCH is successfully received.

In this case, in a first HARQ feedback mode, feedback may be explicitly performed in response to HARQ ACK when the receiver UE successfully decodes the received PSSCH, and when the receiver UE does not successfully decode the received PSSCH, feedback may be explicitly performed in response to HARQ NACK. That is, in the first HARQ feedback mode, HARQ ACK/NACK feedback information may be transmitted for each of HARQ ACK/NACK.

Unlike the first HARQ feedback mode, in a second HARQ feedback mode, HARQ ACK information may not be transmitted when the receiver UE successfully decodes the received PSSCH, and only when the receiver UE does not successfully decode the received PSSCH, feedback may be explicitly performed in response to HARQ NACK. That is, in the second HARQ feedback mode, HARQ NACK feedback information may be transmitted only in the case of the HARQ NACK.

As described above, when two types of HARQ feedback modes are defined, a HARQ feedback mode to be applied for transmitting the HARQ ACK/NACK feedback information in response to the PSSCH received by a receiver UE may be determined as follows.

In at least one embodiment, a HARQ feedback mode for a receiver UE may be explicitly set or instructed.

As an example for setting a HARQ feedback mode, when a sidelink unicast or groupcast session is established, setting the HARQ feedback mode may be performed for each session. That is, at the time of establishing each session, HARQ feedback mode setting information for the sidelink may be transmitted to the receiver UE through higher layer signaling.

As another example for setting a HARQ feedback mode, the HARQ feedback mode may be dynamically instructed through the PSCCH. To do this, an information area for indicating the HARQ feedback mode may be defined in a SCI format including scheduling control information for PSSCH transmission. Alternatively, the HARQ feedback mode may be dynamically instructed through the PDCCH. To do this, an information area for indicating the HARQ feedback mode may be defined in a DCI format for sidelink scheduling control information transmitted by a base station.

Alternatively, HARQ feedback mode setting information of the sidelink may be transmitted to a UE through cell-specific or UE-specific higher layer signaling for each cell.

As further another example of setting a HARQ feedback mode, the HARQ feedback mode may be set for each resource pool. That is, when a base station transmits resource pool configuration information for the sidelink, HARQ feedback mode setting information for the corresponding resource pool may be included in the resource pool configuration information.

In this case, a receiver UE that receives the PSSCH may determine a HARQ feedback mode to be applied for transmitting HARQ ACK/NACK feedback information according to HARQ feedback mode information indicated explicitly.

In at least one embodiment, a HARQ feedback mode for a receiver UE may be implicitly set or instructed.

As an example, the HARQ feedback mode may be determined based on whether the reception of sidelink data is a unicast data reception or a groupcast data reception. For example, when the unicast sidelink data are received, the first HARQ feedback mode may be defined as the HARQ feedback mode. That is, feedback may be explicitly performed (e.g., transmitted) in response to both HARQ ACK and NACK.

As another example, when the groupcast sidelink data are received, the second HARQ feedback mode may be defined as the HARQ feedback mode. That is, feedback may be explicitly performed in response to only HARQ NACK.

In this case, when a received PSSCH is a unicast data reception, a receiver UE that receives the PSSCH may determine the first HARQ feedback mode as the HARQ feedback mode. Unlike this, when a received PSSCH is a groupcast data reception, a receiver UE that receives the PSSCH may determine the second HARQ feedback mode as the HARQ feedback mode.

Referring back to FIG. 14, the receiver UE may transmit the HARQ feedback information according to a result obtained by decoding the PSSCH based on the HARQ feedback mode, at step S1420.

If the first HARQ feedback mode is determined as the HARQ feedback mode, the receiver UE may transmit HARQ NACK to the transmitter UE when the receiver UE does not successfully decode the received PSSCH, and the receiver UE transmit HARQ ACK to the transmitter UE when successfully decoding the received PSSCH.

If the second HARQ feedback mode is determined as the HARQ feedback mode, the receiver UE transmits the HARQ NACK to the transmitter UE when the receiver UE does not successfully decode the received PSSCH. It should be noted that the receiver UE may not transmit any signal to the transmitter UE when successfully decoding the received PSSCH.

As described above, methods and apparatuses are provided for determining a HARQ feedback mode for transmitting NR sidelink HARQ feedback information and for transmitting the sidelink HARQ feedback information according to the determined HARQ feedback mode.

Figure 15:
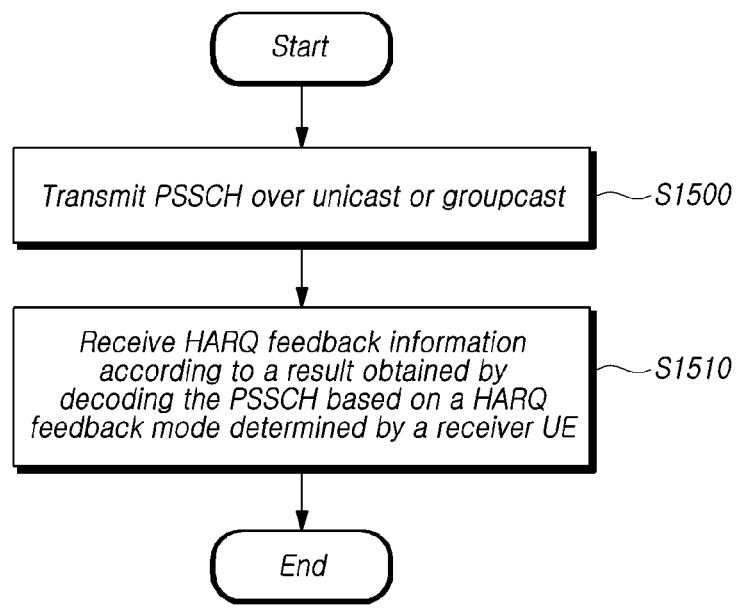
FIG. 15 is a flow diagram illustrating a procedure of receiving sidelink HARQ feedback information by a transmitter UE in accordance with embodiments of the present disclosure.

FIG. 15 is a flow diagram illustrating a procedure of receiving sidelink HARQ feedback information by a transmitter UE in accordance with embodiments of the present disclosure.

Referring to FIG. 15, a transmitter UE may transmit a physical sidelink shared channel (PSSCH) over unicast or groupcast, at step S1500.

As an example, sidelink transmission/reception based on the unicast or the groupcast, as well as the broadcast, may be supported in the NR-based V2X. Accordingly, the transmitter UE may transmit the PSSCH to a receiver UE over the unicast or the groupcast.

Referring back to FIG. 15, the transmitter UE may receive the HARQ feedback information according to a result obtained by decoding the PSSCH based on a HARQ feedback mode determined by a receiver UE, at step S1510.

If the transmitter UE transmits the PSSCH, the receiver UE may perform decoding for the received PSSCH. The receiver UE may determine the HARQ feedback mode for transmitting the HARQ ACK/NACK feedback information according to a result obtained by decoding the PSSCH.

In at least one embodiment, the HARQ feedback mode may be determined according to whether HARQ ACK information is transmitted when the PSSCH is successfully received.

In this case, in a first HARQ feedback mode, feedback may be explicitly performed (e.g., transmitted) in response to HARQ ACK when the receiver UE successfully decodes the received PSSCH. When the receiver UE does not successfully decode the received PSSCH, feedback may be explicitly performed in response to HARQ NACK. That is, in the first HARQ feedback mode, HARQ ACK/NACK feedback information may be transmitted for each of HARQ ACK/NACK.

Unlike the first HARQ feedback mode, in a second HARQ feedback mode, HARQ ACK information is not transmitted when the receiver UE successfully decodes the received PSSCH, and only when the receiver UE does not successfully decode the received PSSCH, feedback may be explicitly performed in response to HARQ NACK. That is, in the second HARQ feedback mode, HARQ NACK feedback information only may be transmitted in the case of the HARQ NACK.

As described above, when two types of HARQ feedback modes are defined, a HARQ feedback mode to be applied for transmitting the HARQ ACK/NACK feedback information for the PSSCH received by a receiver UE may be determined as follows.

In at least one embodiment, for setting a HARQ feedback mode, the transmitter UE may dynamically indicate the HARQ feedback mode through the PSCCH. To do this, an information area for indicating the HARQ feedback mode may be defined in a SCI format including scheduling control information for PSSCH transmission.

However, embodiments of the present disclosure are not limited to thereto. In at least one embodiment, when establishing a sidelink unicast or groupcast session, setting the HARQ feedback mode may be performed for each session. That is, at the time of establishing each session, HARQ feedback mode setting information for the sidelink may be transmitted to the receiver UE through higher layer signaling.

Alternatively, the HARQ feedback mode may be dynamically instructed through the PDCCH. To do this, an information area for indicating the HARQ feedback mode may be defined in a DCI format for sidelink scheduling control information transmitted by a base station.

Alternatively, HARQ feedback mode setting information of the sidelink may be transmitted to a UE through cell-specific or UE-specific higher layer signaling for each cell.

As further another example of setting a HARQ feedback mode, the HARQ feedback mode may be set for each resource pool. That is, when a base station transmits resource pool configuration information for the sidelink, HARQ feedback mode setting information for the corresponding resource pool may be included in the resource pool configuration information.

In this case, a receiver UE that receives the PSSCH may determine a HARQ feedback mode to be applied for transmitting HARQ ACK/NACK feedback information according to HARQ feedback mode information indicated explicitly.

In at least one embodiment, a HARQ feedback mode for a receiver UE may be implicitly set or instructed.

As an example, the HARQ feedback mode may be determined based on whether the reception of sidelink data is a unicast data reception or a groupcast data reception. For example, when the unicast sidelink data are received, the first HARQ feedback mode may be defined as the HARQ feedback mode. That is, in this case, feedback may be explicitly performed in response to both HARQ ACK and NACK.

As another example, when the groupcast sidelink data are received, the second HARQ feedback mode may be defined as the HARQ feedback mode. That is, feedback may be explicitly performed in response to only HARQ NACK.

In this case, when a received PSSCH is a unicast data reception, the receiver UE that receives the PSSCH may determine the first HARQ feedback mode as the HARQ feedback mode. Unlike this, when a received PSSCH is a groupcast data reception, the receiver UE that receives the PSSCH may determine the second HARQ feedback mode as the HARQ feedback mode.

If the first HARQ feedback mode is determined as the HARQ feedback mode, the transmitter UE is able to receive HARQ NACK from the receiver UE due to failure to decode the received PSSCH, or receive HARQ ACK from the receiver UE due to success in decoding the received PSSCH. Accordingly, when the HARQ NACK is received, the transmitter UE may retransmit the PSSCH which is not successfully decoded.

If the second HARQ feedback mode is determined as the HARQ feedback mode, the receiver UE transmits the HARQ NACK to the transmitter UE due to failure to decode the received PSSCH. In this case, when the HARQ NACK is received, the transmitter UE may retransmit the PSSCH which is not successfully decoded.

It should be noted that the receiver UE may not transmit any signal related to HARQ feedback to the transmitter UE when the receiver UE successfully decodes the received PSSCH. As an example, when a signal related to the HARQ feedback on one or more resources allocated for HARQ feedback in response to the PSSCH is not received, the transmitter UE may consider the PSSCH to be successfully transmitted. As another example, when a signal related to the HARQ feedback on one or more resources allocated for HARQ feedback in response to the PSSCH is not received, the transmitter UE may retransmit the PSSCH at a pre-defined number of times to repeat.

As described above, the embodiments of the present disclosure provide methods and apparatuses for determining a HARQ feedback mode for transmitting NR sidelink HARQ feedback information and transmitting the sidelink HARQ feedback information according to the determined HARQ feedback mode.

Hereinbefore, it has been assumed that a node receiving HARQ feedback information is a transmitter UE; however, within the scope of not contradicting the technical spirit or principle of the present disclosure, the foregoing description may be substantially equally applicable to a case where the node receiving the HARQ feedback information is a base station.

Further, hereinbefore, the HARQ ACK/NACK is discussed as examples of sidelink feedback information; however, embodiments of the present disclosure are not limited thereto. As an example, the sidelink feedback information may be sidelink CSI reporting information other than the HARQ ACK/NACK. That is, the above description for the HARQ feedback mode may be substantially equally applicable to a sidelink CSI feedback transmission mode, and therefore, such embodiments or examples may be included within the scope of the present disclosure.

Hereinafter, embodiments related to defining and setting a HARQ feedback mode for transmitting sidelink HARQ feedback information in the NR will be described with reference to related drawings.

In the LTE system, in a sidelink transmission/reception method for providing the V2X service, data transmission through the sidelink is performed based on the broadcast. That is, sidelink communication is performed in such a manner that when a transmitter UE broadcasts a sidelink radio channel or radio signal for transmitting to neighboring UEs without specifying a destination UE, neighboring UEs available to receive the corresponding broadcasting signal receive the corresponding signal. Thus, a HARQ procedure in response to the PSSCH that is a sidelink data channel is not applied in the LTE V2X.

However, in the case of the NR-based V2X, it has been necessary for supporting sidelink transmission/reception based on the unicast or the groupcast, as well as the broadcast.

Like this, as a type of NR-based V2X communication, when a unicast or groupcast based sidelink transmission/reception method is defined, it is necessary to define a HARQ applying method for a corresponding sidelink radio channel, a channel status information (CSI) acquisition method for the sidelink, a link adaptation method, or the like.

In accordance with embodiments of the present disclosure, specific methods are introduced for applying the HARQ in data transmission/reception through the sidelink. In particular, when the unicast or the groupcast through the sidelink is applied, a method of a receiver UE is provided for setting a HARQ feedback mode for transmitting HARQ ACK/NACK feedback information.

Resource allocation for direct communication between devices through the previously defined sidelink may be performed in a distributed method or in a centralized method. That is, in one or more resource pools configured by a base station or pre-configured, a transmitter UE (a transmitting node) may select a radio resource, for example, a sub-channel for sidelink data transmission and transmit a PSSCH and a PSCCH including scheduling control information on the PSSCH through the selected radio resource. Alternatively, a base station may transmit sidelink resource allocation information for a transmitter UE to the transmitter UE through a PDCCH, and the transmitter UE may transmit a corresponding PSCCH and PSSCH through the sidelink resource allocated by the base station. Like this, transmission mode 3 scheduled by a base station or distributed-based transmission mode 4 is defined as a method of transmitting radio data through the sidelink.

When the unicast scheme or groupcast scheme is supported as a method of transmitting the sidelink for the NR-based V2X, an unicast or groupcast link between a transmitter UE and one or more receiver UEs or between one master UE and one or more slave UEs is configured, and a PSSCH transmission resource through the configured link may be also scheduled by a base station or selected by the transmitter UE, as described above.

The receiver UE herein means a UE receiving a PSCCH and a corresponding PSSCH through the sidelink. The transmitter UE herein means a UE transmitting a PSCCH and a corresponding PSSCH through the sidelink.

Herein, a physical sidelink channel for the sidelink feedback information described above is referred to as a physical sidelink feedback channel (PSFCH).

As an example, when a cellular link of a receiver UE is configured, and the receiver UE is in an RRC connected state with a base station/cell, the receiver UE is configured with one or more resource sets for each UL bandwidth part (UL BWP) for HARQ ACK/NACK feedback in response to PDSCH reception from a gNB. In this case, PUCCH resources of the one or more PUCCH resource sets may be reused for sidelink HARQ ACK/NACK feedback. For example, for allocating one or more HARQ ACK/NACK feedback resource(s) in response to sidelink PSSCH reception, ACK/NACK timing indication information and ACK resource indicator (ARI) information may be included in DL control information (DCI) or sidelink control information (SCI) that a base station or a transmitter UE transmits.

Accordingly, the receiver UE may derive resource allocation information for transmitting HARQ ACK/NACK feedback information in response to the PSSCH reception based on the HARQ ACK/NACK timing indication information and the ARI information. In this case, the HARQ ACK/NACK timing indication information may be timing gap information between a slot over which PSSCH transmission and reception are performed and a slot over which HARQ ACK/NACK is transmitted.

Further, when allocating and deriving one or more PUCCH resources based on the ARI information, a procedure of allocating and deriving one or more PUCCH resources for the cellular link of the receiver UE may be reused. That is, the receiver UE may transmit HARQ ACK/NACK feedback information in response to sidelink PSSCH reception through respective PUCCH resources included in one or more PUCCH resource sets configured for an active UL BWP. Accordingly, in deriving one or more PUCCH resources in accordance with the ARI, the receiver UE is able to derive one or more PUCCH resource sets according to a HARQ ACK/NACK payload size based on the corresponding sidelink reception, and derive, according to the ARI, one or more PUCCH resources to be used for HARQ ACK/NACK feedback among PUCCH resources included in the derived PUCCH resource set(s).

Alternatively, one or more separate PUCCH resource sets for sidelink HARQ ACK/NACK feedback may be configured for each UL BWP. Apart from one or more PUCCH resource sets configured for a cellular link for each UL BWP, a base station may configure one or more PUCCH resource sets for the sidelink, and the base station may transmit the configured one or more PUCCH resource sets to a corresponding UE through higher layer signaling. Accordingly, sidelink HARQ ACK/NACK feedback resource allocation through the ARI may be performed based on one or more sidelink PUCCH resource sets.

As another example, a sidelink BWP for sidelink transmission/reception for each UE may be configured by a base station or pre-configured. In this case, a PUCCH resource set for HARQ ACK/NACK feedback may be configured for each sidelink BWP. One or more PUCCH resources for transmitting the HARQ ACK/NACK feedback by a receiver UE may be allocated through one or more PUCCH resource sets configured for an active sidelink BWP for a corresponding receiver UE.

Accordingly, a corresponding ARI may be indicated and interpreted for one or more PUCCH resources included in one or more PUCCH resource sets of the active sidelink BWP. As an example, a sidelink BWP for a UE may be configured to have a correspondence to an UL BWP configuration configured for the UE. For example, the sidelink BWP may be configured to be equal to the UL BWP configuration. In this case, a PUCCH resource set configuration for each sidelink BWP may be configured to be equal to a PUCCH resource set configuration for each UL BWP of a corresponding UE.

As further another example, an associated PUCCH resource set may be configured for each resource pool configured for PSSCH or PSCCH transmission. That is, when a base station transmits sidelink resource pool configuration information through UE-specific or cell-specific higher layer signaling, the corresponding sidelink resource pool configuration information may include an associated PUCCH resource set (or associated PUCCH resource pool) configuration information for the corresponding resource pool.

Accordingly, the PUCCH resource set allocation method based on the ARI described above is equally applied, and in a method of indicating and interpreting the ARI, the corresponding ARI may be indicated and interpreted based on a resource pool over which a corresponding PSSCH or PSCCH is transmitted and an associated PUCCH resource set (or an associated PUCCH resource pool).

As an example, a receiver UE may transmit sidelink HARQ ACK/NACK feedback information through the PSCCH. In this case, a separate SCI format for the HARQ ACK/NACK feedback information may be defined. The SCI format for the HARQ ACK/NACK feedback may be configured with identification information of a sidelink PSSCH received by the receiver UE and ACK/NACK feedback information related to it. The PSSCH identification information may include information on the number of times the PSSCH is received, information on an index of a resource pool or sub-channel over which the PSSCH is received, or information on a timing offset related to PSSCH information reception. Further, the PSSCH identification information may be indicated based on bitmaps or index information.

When sidelink HARQ ACK/NACK feedback is transmitted through the PSCCH, a resource pool is configured for transmitting the PSSCH including the HARQ ACK/NACK feedback information and then transmitted to a sidelink UE through higher layer signaling, or may be pre-configured. At this time, for example, a resource pool for transmitting feedback control information, such as feedback control information (FCI), may be configured independently from a resource pool for transmitting the PSSCH and then transmitted through higher layer signaling, or pre-configured.

In this case, PSCCH resource allocation information to be used for HARQ ACK/NACK feedback by a receiver UE may be configured with i) allocation information on an FCI resource pool over which PSCCH transmission is performed and ii) allocation information on the PSCCH to be used in the corresponding FCI resource pool. For example, the PSCCH allocation information may be sub-channel allocation information. The FCI resource pool allocation information and the PSCCH allocation information may be provided through an explicit DCI format or a SCI format. Alternatively, the FCI resource pool allocation information and the PSCCH allocation information may be determined by a function of an implicit sub-channel index.

In the present disclosure, a method is proposed for defining and setting a HARQ feedback mode for transmitting HARQ ACK/NACK feedback information of a receiver UE in response to the PSSCH transmission of a transmitter UE.

Definition of HARQ Feedback Mode

According to a first embodiment, two sidelink HARQ feedback modes may be defined based on i) a node to which a sidelink receiver UE transmits HARQ ACK/NACK feedback information or ii) an air interface link through which the sidelink receiver UE transmits the HARQ ACK/NACK feedback information. Specifically, a first HARQ feedback mode may be defined as a mode in which a sidelink receiver UE directly transmits HARQ ACK/NACK feedback information in response to the reception of a PSSCH to a gNB. A second HARQ feedback mode may be defined as a mode in which a sidelink receiver UE directly transmits HARQ ACK/NACK feedback information to a transmitter UE that has transmitted a PSSCH.

That is, in the first HARQ feedback mode in accordance with the first embodiment, HARQ ACK/NACK feedback information in response to the PSSCH may be transmitted to a gNB through an Uu interface, for example, a cellular link such as UL. Further, in the second HARQ feedback mode in accordance with the first embodiment, the HARQ ACK/NACK feedback information in response to the PSSCH may be directly transmitted to a transmitter UE through PC5, i.e. the sidelink.

According to a second embodiment, two sidelink HARQ feedback modes may be defined based on whether a receiver UE transmits HARQ ACK feedback information. Specifically, a first HARQ feedback mode may be defined as a mode in which feedback information is transmitted for both ACK and NACK according to a data reception result. Further, a second HARQ feedback mode may be defined as a mode in which feedback information is transmitted for only NACK.

That is, in the first HARQ feedback mode according to the second embodiment, feedback may be explicitly performed in response to HARQ ACK when the sidelink receiver UE successfully decodes the received PSSCH, and when the receiver UE does not successfully decode the received PSSCH, feedback may be explicitly performed in response to for HARQ NACK. Unlike the first HARQ feedback mode, in the second HARQ feedback mode, HARQ ACK information is not transmitted when the sidelink receiver UE successfully decodes the received PSSCH, and only when the sidelink receiver UE does not successfully decode the received PSSCH, feedback may be explicitly performed in response to HARQ NACK.

As described above, the first embodiment for defining the HARQ feedback mode according to the present disclosure is a method for determining a HARQ feedback mode according to a node to which a receiver UE that receives the PSSCH (e.g., sidelink data) transmits the HARQ ACK/NACK feedback information, and the second embodiment is a method for determining a HARQ feedback mode according to whether HARQ ACK information is transmitted when the PSSCH is successfully received.

Hereinafter, it is assumed that the HARQ feedback mode is defined as described above, a method is proposed of setting a HARQ feedback mode to be applied to a case where a sidelink receiver UE transmits HARQ ACK/NACK feedback information.

In at least one embodiment, a HARQ feedback mode for a receiver UE may be explicitly set or instructed. Such a method of explicitly setting or instructing a HARQ feedback mode may be commonly applied to the first embodiment and the second embodiment related to defining the HARQ feedback mode as described above.

As an example for setting a HARQ feedback mode, when a sidelink unicast or groupcast session is established, setting the HARQ feedback mode may be performed for each session. That is, at the time of establishing each session, HARQ feedback mode setting information for the sidelink may be transmitted to one or more corresponding sidelink UEs through higher layer signaling.

As another example for setting a HARQ feedback mode, the HARQ feedback mode may be dynamically instructed through the PSCCH. To do this, as shown in FIG. 16, an information area for indicating the HARQ feedback mode may be defined in a SCI format including scheduling control information for PSSCH transmission. Alternatively, the HARQ feedback mode may be dynamically instructed through the PDCCH. To do this, as shown in FIG. 17, an information area for indicating the HARQ feedback mode may be defined in a DCI format for sidelink scheduling control information transmitted by a base station.

Alternatively, HARQ feedback mode setting information of the sidelink may be transmitted to a UE through cell-specific or UE-specific higher layer signaling for each cell.

As further another example of setting a HARQ feedback mode, the HARQ feedback mode may be set for each resource pool. That is, when a base station transmits resource pool configuration information for the sidelink, HARQ feedback mode setting information for the corresponding resource pool may be included in the resource pool configuration information.

In at least one embodiment, a HARQ feedback mode for a receiver UE may be implicitly set or instructed. A method of implicitly setting or indicating a HARQ feedback mode described below may be applied to the first embodiment related to defining the HARQ feedback mode as described above.

Specifically, a HARQ feedback mode may be determined according to whether a transmitter UE or a receiver UE is connected to a cellular link, for example, whether an RRC connection to a base station is established, or a coverage state. As an example, the HARQ feedback mode may be determined according to whether the RRC connection of a receiver UE is established. That is, when the RRC connection of the receiver UE is established, a first HARQ feedback mode may be activated for performing feedback of HARQ ACK/NACK information to a gNB, and when the RRC connection is not established, a second HARQ feedback mode may be activated for directly transmitting HARQ ACK/NACK feedback information to a transmitter UE.

As another example, the HARQ feedback mode may be determined according to whether the RRC connections of both a receiver UE and a transmitter UE are established. That is, only when the RRC connections of the receiver UE and the transmitter UE are established, the first HARQ feedback mode may be activated for performing feedback of HARQ ACK/NACK information to a gNB, and when the RRC connection of at least one of the receiver UE and the transmitter UE is not established, the second HARQ feedback mode may be activated for directly transmitting HARQ ACK/NACK feedback information to the transmitter UE.

Additionally, a HARQ feedback mode may be differently determined according to whether a gNB or a cell with which the transmitter UE establishes the RRC connection is equal to a gNB or a cell with which the receiver UE establishes the RRC connection. That is, even when both the transmitter UE and the receiver UE are in RRC connected state, when the transmitter UE and the receiver UE establish the RRC connections with respective gNBs or cells, which are different from each other, the second HARQ feedback mode may be activated for directly transmitting HARQ ACK/NACK feedback information to the transmitter UE. To do this, information on whether the RRC connection is established or information on a PCID which is an ID of a cell with which the RRC connection is established, for example, including update information of individual information, or the like may be transmitted or received between sidelink UEs through the sidelink, or reported to a base station.

As further another example, the HARQ feedback mode may be determined by a sidelink transmission mode of a sidelink UE. For example, when sidelink transmission mode 3 is set for a base station to perform sidelink resource allocation, the first HARQ feedback mode may be activated for directly transmitting HARQ ACK/NACK feedback information to the base station. As another example, when sidelink transmission mode 4 which is a distributed scheme is set, the second HARQ feedback mode may be activated for directly transmitting HARQ ACK/NACK feedback information to a corresponding sidelink transmitter UE.

As further another example, the HARQ feedback mode may be determined based on HARQ ACK/NACK feedback timing information for the reception of the PSSCH by a receiver UE. For example, when a slot of a receiver UE corresponding to a HARQ ACK/NACK feedback timing set or instructed by a base station or a transmitter UE is a cellular UL slot which is an Uu link slot, the first HARQ feedback mode may be activated for directly transmitting HARQ ACK/NACK feedback information to the base station. As another example, when a slot of a receiver UE corresponding to a HARQ ACK/NACK feedback timing set or instructed by a base station or a transmitter UE is a sidelink slot, the second HARQ feedback mode may be activated for directly transmitting HARQ ACK/NACK feedback information to the transmitter UE.

In at least one embodiment, a HARQ feedback mode for a receiver UE may be implicitly set or instructed. A method of implicitly setting or instructing a HARQ feedback mode described below may be applied to the second embodiment related to defining the HARQ feedback mode as described above.

Specifically, the HARQ feedback mode may be determined based on whether the reception of sidelink data is a unicast data reception or a groupcast data reception. For example, when the unicast sidelink data are received, the first HARQ feedback mode of the second embodiment may be defined as the HARQ feedback mode. That is, in this case, feedback may be explicitly performed in response to both HARQ ACK and NACK. As another example, when the groupcast sidelink data are received, the second HARQ feedback mode of the second embodiment may be defined as the HARQ feedback mode. That is, feedback may be explicitly performed in response to only HARQ NACK.

Hereinbefore, the HARQ ACK/NACK has been discussed as examples of sidelink feedback information; however, embodiments of the present disclosure are not limited thereto. As an example, the sidelink feedback information may be sidelink CSI reporting information other than the HARQ ACK/NACK. That is, the above description for the HARQ feedback mode may be substantially equally applicable to a sidelink CSI feedback transmission mode, and therefore, such embodiments or examples may be included within the scope of the present disclosure.

As described above, to the embodiments of the present disclosure provide methods and apparatuses for determining a HARQ feedback mode for transmitting NR sidelink HARQ feedback information, and transmitting the sidelink HARQ feedback information according to the determined HARQ feedback mode.

Hereinafter, structures of a receiver UE and a transmitter UE capable of performing a part or all of the embodiments described with reference to FIGS. 1 to 17 will be discussed with reference to the drawings.

Figure 18:
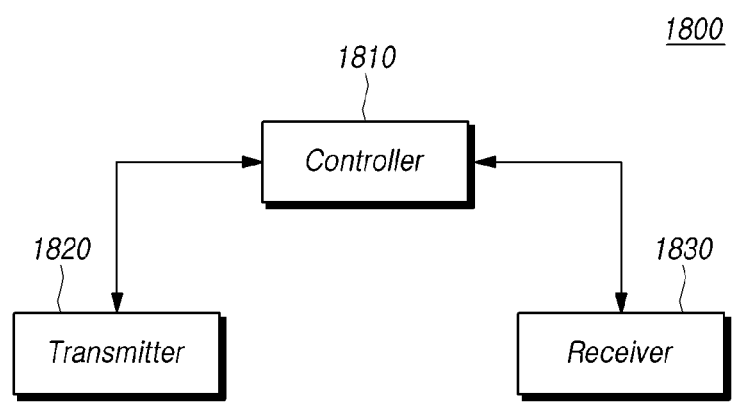
FIG. 18 is a block diagram illustrating a receiver UE according to embodiments of the present disclosure.

FIG. 18 is a block diagram illustrating a receiver UE 1800 according to embodiments of the present disclosure.

Referring to FIG. 18, the receiver UE 1800 includes a controller 1810, a transmitter 1820, and a receiver 1830.

The controller 1810 controls overall operations of the receiver UE 1800 related to methods of transmitting sidelink HARQ feedback information needed to perform embodiments of the present disclose. The transmitter 1820 transmits UL control information, sidelink control information, data, messages, or the like to a base station or one or more other UEs through a corresponding channel. The receiver 1830 receives DL control information, sidelink control information, data, messages, or the like from a base station or one or more other UEs through a corresponding channel.

As an example, sidelink transmission/reception based on the unicast or the groupcast, as well as the broadcast, may be supported in the NR-based V2X. The receiver 1830 may receive a physical sidelink shared channel (PSSCH) over the unicast or the groupcast.

The controller 1810 may determine a HARQ feedback mode for transmitting HARQ feedback information in response to the reception of the PSSCH.

The controller 1810 may decode the PSSCH received from the transmitter UE. The controller 1810 may determine the HARQ feedback mode for transmitting the HARQ ACK/NACK feedback information according to a result obtained by decoding the PSSCH.

In at least one embodiment, the HARQ feedback mode may be determined according to whether HARQ ACK information is transmitted when the PSSCH is successfully received.

In this case, in a first HARQ feedback mode, feedback may be explicitly performed in response to for HARQ ACK when the receiver UE successfully decodes the received PSSCH, and when the receiver UE does not successfully decode the received PSSCH, feedback may be explicitly performed in response to HARQ NACK. That is, in the first HARQ feedback mode, HARQ ACK/NACK feedback information may be transmitted for each of HARQ ACK/NACK.

Unlike the first HARQ feedback mode, in a second HARQ feedback mode, HARQ ACK information is not transmitted when the receiver UE successfully decodes the received PSSCH, and only when the receiver UE does not successfully decode the received PSSCH, feedback may be explicitly performed in response to HARQ NACK. That is, in the second HARQ feedback mode, HARQ NACK feedback information may be transmitted only in the case of the HARQ NACK.

As described above, when two types of HARQ feedback modes are defined, a HARQ feedback mode to be applied for transmitting the HARQ ACK/NACK feedback information for the PSSCH received by a receiver UE may be determined as follows.

In at least one embodiment, a HARQ feedback mode for a receiver UE may be explicitly set or instructed.

As an example for setting a HARQ feedback mode, when a sidelink unicast or groupcast session is established, the HARQ feedback mode may be set for each session. That is, at the time of establishing each session, HARQ feedback mode setting information for the sidelink may be transmitted to the receiver UE through higher layer signaling.

As another example for setting a HARQ feedback mode, the HARQ feedback mode may be dynamically instructed through the PSCCH. To do this, an information area for indicating the HARQ feedback mode may be defined in a SCI format including scheduling control information for PSSCH transmission. Alternatively, the HARQ feedback mode may be dynamically instructed through the PDCCH. To do this, an information area for indicating the HARQ feedback mode may be defined in a DCI format for sidelink scheduling control information transmitted by a base station.

Alternatively, HARQ feedback mode setting information of the sidelink may be transmitted to a UE through cell-specific or UE-specific higher layer signaling for each cell.

As further another example of setting a HARQ feedback mode, the HARQ feedback mode may be set for each resource pool. That is, when a base station transmits resource pool configuration information for the sidelink, HARQ feedback mode setting information for the corresponding resource pool may be included in the resource pool configuration information.

In this case, the controller 1810 of the receiver UE that receives the PSSCH may determine a HARQ feedback mode to be applied for transmitting HARQ ACK/NACK feedback information according to HARQ feedback mode information indicated explicitly.

In at least one embodiment, a HARQ feedback mode for a receiver UE may be implicitly set or instructed.

As an example, the HARQ feedback mode may be determined based on whether the reception of sidelink data is a unicast data reception or a groupcast data reception. For example, when the unicast sidelink data are received, the first HARQ feedback mode may be defined as the HARQ feedback mode. That is, in this case, feedback may be performed explicitly in response to both HARQ ACK and NACK.

As another example, when the groupcast sidelink data are received, the second HARQ feedback mode may be defined as the HARQ feedback mode. That is, feedback may be explicitly performed (e.g., transmitted) in response to only HARQ NACK.

In this case, when a received PSSCH is a unicast data reception, the controller 1810 of the receiver UE that receives the PSSCH may determine the first HARQ feedback mode as the HARQ feedback mode. Unlike this, when a received PSSCH is a groupcast data reception, the controller 1810 may determine the second HARQ feedback mode as the HARQ feedback mode.

The transmitter 1820 may transmit the HARQ feedback information according to a result obtained by decoding the PSSCH based on the HARQ feedback mode.

If the first HARQ feedback mode is determined as the HARQ feedback mode, the transmitter 1820 may transmit HARQ NACK to a transmitter UE when the receiver UE does not successfully decode the received PSSCH, and the transmitter 1820 may transmit HARQ ACK to the transmitter UE when the receiver UE successfully decodes the received PSSCH.

If the second HARQ feedback mode is determined as the HARQ feedback mode, the transmitter 1820 may transmit the HARQ NACK to the transmitter UE when the receiver UE does not successfully decode the received PSSCH. It should be noted that the transmitter 1820 may not transmit any signal to the transmitter UE when the receiver UE successfully decodes the received PSSCH.

As described above, to the embodiments of the present disclosure provide methods and apparatuses for determining a HARQ feedback mode for transmitting NR sidelink HARQ feedback information, and transmitting the sidelink HARQ feedback information according to the determined HARQ feedback mode.

Figure 19:
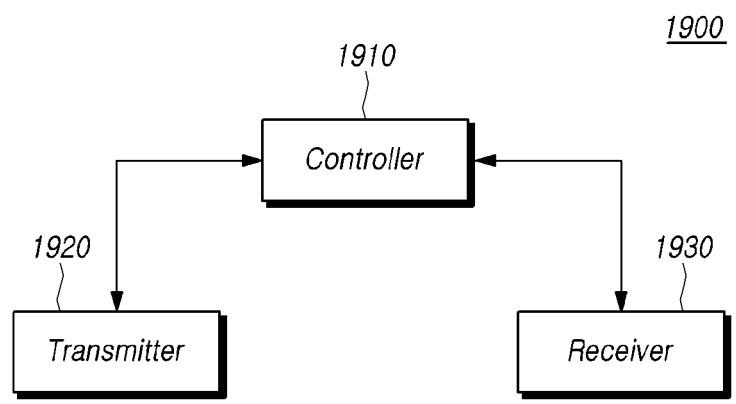
FIG. 19 is a block diagram illustrating a transmitter UE according to embodiments of the present disclosure.

FIG. 19 is a block diagram illustrating a transmitter UE according to embodiments of the present disclosure.

Referring to FIG. 19, the receiver UE 1900 includes a controller 1910, a transmitter 1920, and a receiver 1930.

The controller 1910 controls overall operations of the transmitter UE 1900 related to methods of transmitting sidelink HARQ feedback information needed to perform embodiments of the present disclose. The transmitter 1920 is used to transmit signals, messages, and data needed for performing embodiments of the present disclosure to one or more other UEs or a base station. The receiver 1930 is used to receive signals, messages, and data needed for performing embodiments of the present disclosure from one or more other UEs or a base station.

As an example, sidelink transmission/reception based on the unicast or the groupcast, as well as the broadcast, may be supported in the NR-based V2X. The transmitter 1920 may transmit the PSSCH to a receiver UE over the unicast or the groupcast.

The receiver 1930 may receive the HARQ feedback information according to a result obtained by decoding the PSSCH based on a HARQ feedback mode determined by the receiver UE.

If the transmitter 1920 transmits the PSSCH, the receiver UE may decode the received PSSCH. The receiver UE may determine a HARQ feedback mode for transmitting HARQ ACK/NACK feedback information according to a result obtained by decoding the PSSCH.

In at least one embodiment, the HARQ feedback mode may be determined according to whether HARQ ACK information is transmitted when the PSSCH is successfully received.

In this case, in a first HARQ feedback mode, feedback may be explicitly performed in response to HARQ ACK when the sidelink receiver UE successfully decodes the received PSSCH, and when the sidelink receiver UE does not successfully decode the received PSSCH, feedback may be explicitly performed in response to HARQ NACK. That is, in the first HARQ feedback mode, HARQ ACK/NACK feedback information may be transmitted for each of HARQ ACK/NACK.

Unlike the first HARQ feedback mode, in a second HARQ feedback mode, HARQ ACK information may not be transmitted when the sidelink receiver UE successfully decodes the received PSSCH, and only when the sidelink receiver UE does not successfully decode the received PSSCH, feedback may be explicitly performed in response to HARQ NACK. That is, in the second HARQ feedback mode, HARQ NACK feedback information may be transmitted only in the case of the HARQ NACK.

As described above, when two types of HARQ feedback modes are defined, a HARQ feedback mode to be applied for transmitting the HARQ ACK/NACK feedback information for the PSSCH received by a receiver UE may be determined as follows.

In at least one embodiment, for setting a HARQ feedback mode, the transmitter 1920 may dynamically instruct the HARQ feedback mode through the PSCCH. To do this, an information area for indicating the HARQ feedback mode may be defined in a SCI format including scheduling control information for PSSCH transmission.

However, embodiments of the present disclosure are not limited to thereto. As another example, when establishing a sidelink unicast or groupcast session, setting a HARQ feedback mode may be performed for each session. That is, at the time of establishing each session, HARQ feedback mode setting information for the sidelink may be transmitted to a receiver UE through higher layer signaling.

Alternatively, the HARQ feedback mode may be dynamically instructed through the PDCCH. To do this, an information area for indicating the HARQ feedback mode may be defined in a DCI format for sidelink scheduling control information transmitted by a base station.

Alternatively, HARQ feedback mode setting information of the sidelink may be transmitted to a UE through cell-specific or UE-specific higher layer signaling for each cell.

As further another example of setting a HARQ feedback mode, the HARQ feedback mode may be set for each resource pool. That is, when a base station transmits resource pool configuration information for the sidelink, HARQ feedback mode setting information for the corresponding resource pool may be included in the resource pool configuration information.

In this case, a receiver UE that receives the PSSCH may determine a HARQ feedback mode to be applied for transmitting HARQ ACK/NACK feedback information according to HARQ feedback mode information indicated explicitly.

In at least one embodiment, a HARQ feedback mode for a receiver UE may be implicitly set or instructed.

As an example, the HARQ feedback mode may be determined based on whether the reception of sidelink data is a unicast data reception or a groupcast data reception. For example, when the unicast sidelink data are received, the first HARQ feedback mode may be defined as the HARQ feedback mode. That is, in this case, feedback may be explicitly transmitted (e.g., performed) in response to both HARQ ACK and NACK.

As another example, when the groupcast sidelink data are received, the second HARQ feedback mode may be defined as the HARQ feedback mode. That is, feedback may be explicitly transmitted (e.g., performed) in response to only HARQ NACK.

In this case, when a received PSSCH is a unicast data reception, the receiver UE that receives the PSSCH may determine the first HARQ feedback mode as the HARQ feedback mode. Unlike this, when a received PSSCH is a groupcast data reception, the receiver UE that receives the PSSCH may determine the second HARQ feedback mode as the HARQ feedback mode.

If the first HARQ feedback mode is determined as the HARQ feedback mode, the receiver 1930 may receive HARQ NACK from the receiver UE due to failure to decode the received PSSCH, or the receiver 1930 may receive HARQ ACK from the receiver UE due to success in decoding the received PSSCH. Accordingly, when the HARQ NACK is received, the transmitter 1920 may retransmit the PSSCH which is not successfully decoded.

If the second HARQ feedback mode is determined as the HARQ feedback mode, the receiver 1930 may receive the HARQ NACK from the receiver UE due to failure to decode the received PSSCH. Accordingly, the transmitter 1920 may retransmit the PSSCH.

It should be noted that the receiver 1930 may not receive any signal related to this from the receiver UE when the receiver UE successfully decodes the received PSSCH. As an example, when a signal related to the HARQ feedback on one or more resources allocated for HARQ feedback in response to the PSSCH is not received, the controller 1910 may consider the PSSCH to be successfully transmitted. As another example, when a signal related to the HARQ feedback on one or more resources allocated for HARQ feedback in response to the PSSCH is not received, the transmitter 1920 may retransmit the PSSCH at a predefined number of times to repeat.

As described above, the embodiments of the present disclosure provide methods and apparatuses for determining a HARQ feedback mode for transmitting NR sidelink HARQ feedback information and for transmitting the sidelink HARQ feedback information according to the determined HARQ feedback mode.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

What is claimed is:

1. A method of a receiver user equipment (UE) for transmitting sidelink hybrid automatic repeat request (HARQ) feedback information, the method comprising:
   receiving sidelink control information (SCI) indicating a second HARQ feedback mode between a first HARQ feedback mode and a second HARQ feedback mode for a groupcast;
   receiving a physical sidelink shared channel (PSSCH) over the groupcast; and
   determining a reception status of the PSSCH over the groupcast,
   wherein the first HARQ feedback mode for the groupcast is to transmit the sidelink HARQ feedback information including acknowledgement (ACK) information or negative acknowledgement (NACK) information based on the reception status, which is determined as an ACK or a NACK, respectively, of the PSSCH over the groupcast,
   wherein the second HARQ feedback mode for the groupcast is i) to transmit the sidelink HARQ feedback information including NACK information based on the reception status, which is determined as a NACK, and ii) not to transmit the sidelink HARQ feedback information based on the reception status, which is determined as an ACK, of the PSSCH over the groupcast, and wherein, according to the second HARQ feedback mode for the groupcast indicated in the SCI, the sidelink HARQ feedback information is transmitted including only NACK information.

2. A method of a transmitter user equipment (UE) for receiving sidelink hybrid automatic repeat request (HARQ) feedback information, the method comprising:

transmitting sidelink control information (SCI) indicating a second HARQ feedback mode between a first HARQ feedback mode and a second HARQ feedback mode for a groupcast;

transmitting a physical sidelink shared channel (PSSCH) over the groupcast; and determining a reception status of the PSSCH over the groupcast, wherein the first HARQ feedback mode for the groupcast is to receive the sidelink HARQ feedback information including acknowledgement (ACK) information or negative acknowledgement (NACK) information, which is determined as an ACK or a NACK, respectively, of the PSSCH over the groupcast, wherein the second HARQ feedback mode for the groupcast is i) to receive the sidelink HARQ feedback information including NACK information, which is determined as a NACK, and ii) not to receive the sidelink HARQ feedback information, which is determined as an ACK, of the PSSCH over the groupcast, and wherein, according to the second HARQ feedback mode for the groupcast indicated in the SCI, the sidelink HARQ feedback information is received including only NACK information.

3. A receiver user equipment (UE) for transmitting sidelink hybrid automatic repeat request (HARQ) feedback information, the receiver UE comprising:

a receiver configured to receive sidelink control information (SCI) indicating a second HARQ feedback mode between a first HARQ feedback mode and a second HARQ feedback mode for a groupcast, and to receive a physical sidelink shared channel (PSSCH) over the groupcast; and a controller configured to determine a reception status of the PSSCH over the groupcast, wherein the first HARQ feedback mode for the groupcast is to transmit the sidelink HARQ feedback information including acknowledgement (ACK) information or negative acknowledgement (NACK) information based on the reception status, which is determined as an ACK or a NACK, respectively, of the PSSCH over the groupcast, wherein the second HARQ feedback mode for the groupcast is i) to transmit the sidelink HARQ feedback information including NACK information based on the reception status, which is determined as a NACK, and ii) not to transmit the sidelink HARQ feedback information based on the reception status, which is determined as an ACK, of the PSSCH over the groupcast, and wherein, according to the second HARQ feedback mode for the groupcast indicated in the SCI, the sidelink HARQ feedback information is transmitted including only NACK information.

* * * * *